United States Patent
Patil et al.

(10) Patent No.: US 12,063,574 B2
(45) Date of Patent: Aug. 13, 2024

(54) ENHANCED BROADCAST SERVICES (EBCS) DOWNLINK BROADCASTS

(71) Applicant: QUALCOMM Incorporated, San Diego, CA (US)

(72) Inventors: Abhishek Pramod Patil, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/382,212

(22) Filed: Jul. 21, 2021

(65) Prior Publication Data
US 2023/0026143 A1    Jan. 26, 2023

(51) Int. Cl.
H04W 4/06 (2009.01)
H04L 61/50 (2022.01)
H04W 72/12 (2023.01)

(52) U.S. Cl.
CPC ............... *H04W 4/06* (2013.01); *H04L 61/50* (2022.05); *H04W 72/12* (2013.01)

(58) Field of Classification Search
CPC .......... H04W 4/06; H04W 72/12; H04L 61/50
See application file for complete search history.

(56) References Cited

U.S. PATENT DOCUMENTS

| | | | |
|---|---|---|---|
| 9,893,906 B2 | 2/2018 | Cariou et al. | |
| 10,548,146 B2 | 1/2020 | Chun et al. | |
| 11,395,265 B2 | 7/2022 | Cariou et al. | |
| 11,418,997 B2 | 8/2022 | Devadoss et al. | |
| 2017/0353921 A1* | 12/2017 | Li | H04W 52/0206 |
| 2019/0191451 A1* | 6/2019 | Patil | H04W 72/1289 |
| 2020/0008095 A1* | 1/2020 | Patil | H04W 12/03 |
| 2020/0106824 A1 | 4/2020 | Erkin et al. | |

(Continued)

FOREIGN PATENT DOCUMENTS

WO    WO-2021092467 A1    5/2021

OTHER PUBLICATIONS

International Search Report and Written Opinion—PCT/US2022/034460—ISA/EPO—dated Sep. 28, 2022.

(Continued)

*Primary Examiner* — Yaotang Wang
(74) *Attorney, Agent, or Firm* — Holland & Hart LLP

(57) ABSTRACT

This disclosure provides methods, devices and systems for reliable delivery of enhanced broadcast services (EBCS) downlink (DL) packets to wireless stations (STAs) that support EBCS (also referred to as "EBCS STAs") and maintaining interoperability with STAs that do not support EBCS. A wireless communication device may broadcast one or more EBCS DL packets carrying data associated with an EBCS service. In some aspects, the wireless communication device may subsequently transmit a trigger frame soliciting information indicating which, if any, of the EBCS DL packets were missed by EBCS STAs in the vicinity. In some other aspects, each EBCS DL packet may carry signaling indicating that the broadcast data is intended only for EBCS STAs. Still further, in some aspects, the wireless communication device may broadcast an EBCS traffic advertisement indicating a timing of the one or more EBCS DL packets.

26 Claims, 17 Drawing Sheets

(56) References Cited

U.S. PATENT DOCUMENTS

2023/0028494 A1  1/2023 Patil et al.

OTHER PUBLICATIONS

LAN/MAN Standards Committee of the IEEE Computer Society: "P802.11bc(TM)/D0.1 Draft Standard for Information Technology—Telecommunications and Information Exchange between Systems Local and Metropolitan Area Networks—Specific Requirements", Draft P802.11BC_D0.1, IEEE-SA, Piscataway, NJ USA, vol. 802.11bc Drafts, No. D0.1, Aug. 11, 2020, pp. 1-57, XP068170786, Proposal.
Morioka H (SRC Software)., "CC31 Resolutions for Clause 10, 11 and 12", 11-20-1417-04-00BC, IEEE-SA Mentor, Piscataway, NJ USA vol. 802.11bc, No. 4, Sep. 17, 2020, pp. 1-24, XP068173359, 11.bc.2. eBCS Info Frame Generation and Usage, 12.bb.3.1 General.
Morioka H (SRC Software)., "Resolutions for Clause 11.100.2", 11-21-0239-06-00BC, IEEE-SA Mentor, Piscataway, NJ USA, vol. 802.11bc, No. 6, Jul. 13, 2021, 19 Pages, XP068182465, 9.2.4.1.3 Type and Subtype subfields, 9.4.2.x EBCS TIM element, 11.55.2 EBCS DL procedure, figure 11-bc1 EBCS DL frame sequence, 11.55.2.2 EBCS DL operation at an EBCS AP, 11.55.2.3 EBCS DL operation at an EBCS receiver, 9.4.5.30 Enhanced Broadcast Services, ANQP-element.
Oliva A.L(Interdigital)., et al., "Service Discovery Advertisement", 11-19-2017-00-00BC, IEEE-SA Mentor, Piscataway, NJ USA, vol. 802.11bc, Nov. 11, 2019, 9 Pages, XP068164426, Slide 2: Service discovery requirements, Slide 4: Service discovery information, Slide 6: Periodic Framing, Slide 7: Ways of providing the service discovery.
Wang X (Interdigital)., et al., "Power Efficient Broadcasting", 11-20-0551-02-00BC, IEEE-SA Mentor, Piscataway, NJ USA, vol. 802.11bc, No. 2, Jun. 1, 2020, pp. 1-12, XP068168146, Slide 7: Method 3: A advertises a schedule for broadcast service, slide 6: Ways to Prevent Energy Waste.

\* cited by examiner

ENHANCED BROADCAST SERVICES (EBCS) DOWNLINK BROADCASTS

TECHNICAL FIELD

This disclosure relates generally to wireless communication, and more specifically to broadcasting downlink data in enhanced broadcast services (EBCS) frames.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In many BSSs, only STAs that are associated with an AP can participate in uplink (UL) or downlink (DL) data transmissions with the AP. However, the IEEE 802.11bc amendment of the IEEE 802.11 standard defines an enhanced broadcast services (EBCS) protocol that provides enhanced transmission and reception of broadcast data in a BSS for associated STAs and unassociated STAs. For example, an AP that supports EBCS (also referred to as an "EBCS AP") may broadcast EBCS frames carrying DL data for one or more EBCS services. Any STA that supports EBCS (also referred to as an "EBCS STA") may receive the EBCS frames for a given EBCS service while in an associated or an unassociated state.

Existing versions of the IEEE 802.11 standard define a broadcast address that can be used to signal, to all STAs associated with a BSS, that a packet carries broadcast data. However, by broadcasting EBCS frames using the broadcast address, an EBCS AP may cause some associated STAs that do not support EBCS (referred to herein as "non-EBCS STAs") to unnecessarily wake up in response to broadcast frames they cannot decode or interpret. Further, although the IEEE 802.11bc amendment allows EBCS STAs to receive EBCS frames in an unassociated state, there is currently no mechanism by which a STA can acknowledge receipt of DL data unless associated with the AP that transmitted the DL data. As such, an EBCS AP may not know whether any unassociated EBCS STAs fail to receive one or more EBCS frames associated with a given EBCS service.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include broadcasting an enhanced broadcast services (EBCS) information frame advertising one or more EBCS services provided by the wireless communication device; and transmitting a packet having a header followed by a data portion that carries data associated with a first EBCS service of the one or more EBCS services, where the header carries EBCS signaling indicating that the data is intended for wireless stations (STAs) that are associated with the wireless communication device and STAs that are unassociated with the wireless communication device.

In some aspects, the EBCS signaling may be carried in a medium access control (MAC) header that includes a receiver address (RA) field and a frame control field having type and subtype subfields, where the type and subtype subfields collectively indicate a type of the packet. In some implementations, the EBCS signaling may include values carried in the type and subtype subfields indicating that the packet is an EBCS Data frame. In some other implementations, the EBCS signaling may include an EBCS receiver address, carried in the RA field, that is different than a broadcast address which identifies packets broadcast to all users associated with the wireless communication device. In some implementations, the EBCS receiver address may be known to STAs that support EBCS. In some other implementations, the EBCS receiver address may be the same for each of the one or more EBCS services provided by the wireless communication device. Still further, in some implementations, the EBCS receiver address may be unique to the first EBCS service. In such implementations, the EBCS receiver address may be derived from a MAC address or an internet protocol (IP) address of a host device that hosts the first EBCS service.

In some aspects, the EBCS information frame may further carry a traffic advertisement indicating a timing of data transmissions associated with each of the one or more EBCS services, where the traffic advertisement includes a bitmap indicating which of the one or more EBCS services are scheduled for data transmissions during a respective delivery traffic indication message (DTIM) period. In some other aspects, the method may further include broadcasting a beacon frame carrying a traffic advertisement indicating a timing of data transmissions associated with each of the one or more EBCS services. In some implementations, the traffic advertisement may include a bitmap indicating which of the one or more EBCS services are scheduled for data transmissions during a respective DTIM period. In some implementations, the traffic advertisement may be carried in a new element of the beacon frame that is different than a traffic indication map (TIM) element.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including broadcasting an EBCS information frame advertising one or more EBCS services provided by the wireless communication device; and transmitting a packet having a header followed by a data portion that carries data associated with a first EBCS service of the one or more EBCS services, where the header carries EBCS signaling indicating that the data is intended for STAs that are associated with the wireless communication device and STAs that are unassociated with the wireless communication device.

Another innovative aspect of the subject matter described in this disclosure can be implemented as a method of wireless communication. The method may be performed by a wireless communication device, and may include receiving an EBCS information frame advertising one or more EBCS services provided by a first access point (AP); and receiving, from the first AP, a first packet having a header followed by a data portion that carries data associated with a first EBCS service of the one or more EBCS services, where the header carries EBCS signaling indicating that the data is intended for STAs that are associated with the first AP and STAs that are unassociated with the first AP.

In some aspects, the EBCS signaling may be carried in a MAC header that includes an RA field and a frame control field having type and subtype subfields, where the type and subtype subfields collectively indicate a type of the first packet. In some implementations, the EBCS signaling may include values carried in the type and subtype subfields indicating that the first packet is an EBCS Data frame. In some other implementations, the EBCS signaling may include an EBCS receiver address, carried in the RA field, that is different than a broadcast address which identifies packets broadcast to all users associated with the wireless communication device. In some implementations, the EBCS receiver address may be known to the wireless communication device. In some other implementations, the EBCS receiver address may be the same for each of the one or more EBCS services provided by the wireless communication device. Still further, in some implementations, the EBCS receiver address may be unique to the first EBCS service. In such implementations, the method may further include receiving, from a second AP, a second packet carrying data associated with the first EBCS service, where the second packet has an RA field set to the EBCS receiver address.

In some aspects, the EBCS information frame may further carry a traffic advertisement indicating a timing of data transmissions associated with each of the one or more EBCS services, where the traffic advertisement includes a bitmap indicating which of the one or more EBCS services are scheduled for data transmissions during a respective DTIM period. In some implementations, the method may further include waking from a low-power state based on the timing of the data transmissions indicated by the traffic advertisement. In some other aspects, the method may further include receiving, from the first AP, a beacon frame carrying a traffic advertisement indicating a timing of data transmissions associated with each of the one or more EBCS services; and waking from a low-power state based on the timing of the data transmissions indicated by the traffic advertisement. In some implementations, the traffic advertisement may include a bitmap indicating which of the one or more EBCS services are scheduled for data transmissions during a respective DTIM period. In some implementations, the traffic advertisement may be carried in a new element of the beacon frame that is different than a TIM element.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving an EBCS information frame advertising one or more EBCS services provided by a first AP; and receiving, from the first AP, a first packet having a header followed by a data portion that carries data associated with a first EBCS service of the one or more EBCS services, where the header carries EBCS signaling indicating that the data is intended for STAs that are associated with the first AP and STAs that are unassociated with the first AP.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
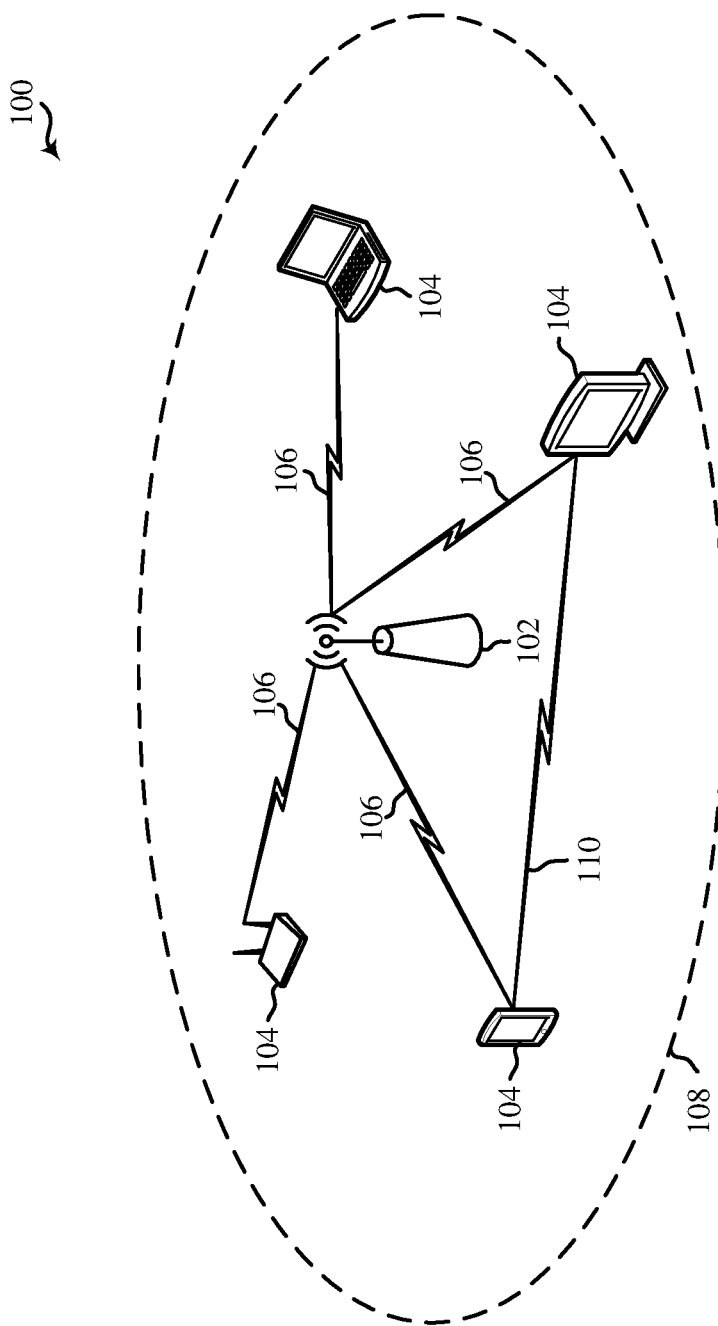
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

Various aspects relate generally to enhanced broadcast services (EBCS), and more particularly, to packet designs and protocols that support reliable delivery of broadcast data associated with EBCS services to STAs that support EBCS (also referred to as "EBCS STAs") and also maintain interoperability with STAs that do not support EBCS (referred to herein as "non-EBCS STAs"). For example, an access point (AP) may transmit one or more EBCS downlink (DL) packets carrying data associated with an EBCS service. In some aspects, the AP may subsequently transmit a trigger frame soliciting a trigger-based (TB) physical layer (PHY) convergence protocol (PLCP) protocol data unit (PPDU) that carries information indicating which, if any, of the EBCS DL packets were missed by EBCS STAs in the vicinity. For example, each missed EBCS DL packet may be identified in the TB PPDU by a respective sequence number. The AP may then transmit or rebroadcast any missed EBCS DL packets indicated in the TB PPDU. In some other aspects, each EBCS DL packet may carry signaling indicating that the broadcast data is intended only for EBCS STAs. For example, the signaling may be carried in a header of the EBCS DL packet (such as in a PHY preamble or a medium access control (MAC) header). Only EBCS STAs may recognize such signaling and proceed to decode or otherwise recover the data carried in the EBCS DL packet. In contrast, non-EBCS STAs may not recognize the signaling in the header of the EBCS DL packet and may thus determine that they are not the intended recipients of the data carried therein. Still further, in some aspects, the AP may broadcast an EBCS traffic advertisement indicating a timing of the one or more EBCS DL packets. For example, the EBCS traffic advertisement may be carried in beacon frames or EBCS information frames.

Particular implementations of the subject matter described in this disclosure can be implemented to realize one or more of the following potential advantages. By soliciting a TB PPDU from EBCS STAs in response to transmitting one or more EBCS DL packets, aspects of the present disclosure may allow such EBCS STAs to provide feedback to an AP regarding the transmission of the EBCS DL packets. More specifically, an EBCS STA may use the TB PPDU to request retransmission of any EBCS DL packets which it may have missed from the previous transmission by the AP. By signaling that the EBCS DL packets carry broadcast data intended only for EBCS STAs, aspects of the present disclosure may prevent EBCS transmissions from waking up any non-EBCS STAs that may be associated with an AP but in a low power state. For example, a non-EBCS STA can quickly determine, based on the signaling in the header of an EBCS DL packet, that it is not an intended recipient and thus ignore the EBCS DL packet. By broadcasting EBCS traffic advertisements prior to the transmission of one or more EBCS DL packets, aspects of the present disclosure may support aperiodic transmissions of such EBCS DL packets. For example, an EBCS STA that receives an EBCS traffic advertisement may ensure that it is awake to receive the EBCS DL packets at the time of transmission. The EBCS traffic advertisement also allows such EBCS STAs to enter a low power state while waiting for the transmission of EBCS DL packets associated with a desired EBCS service.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
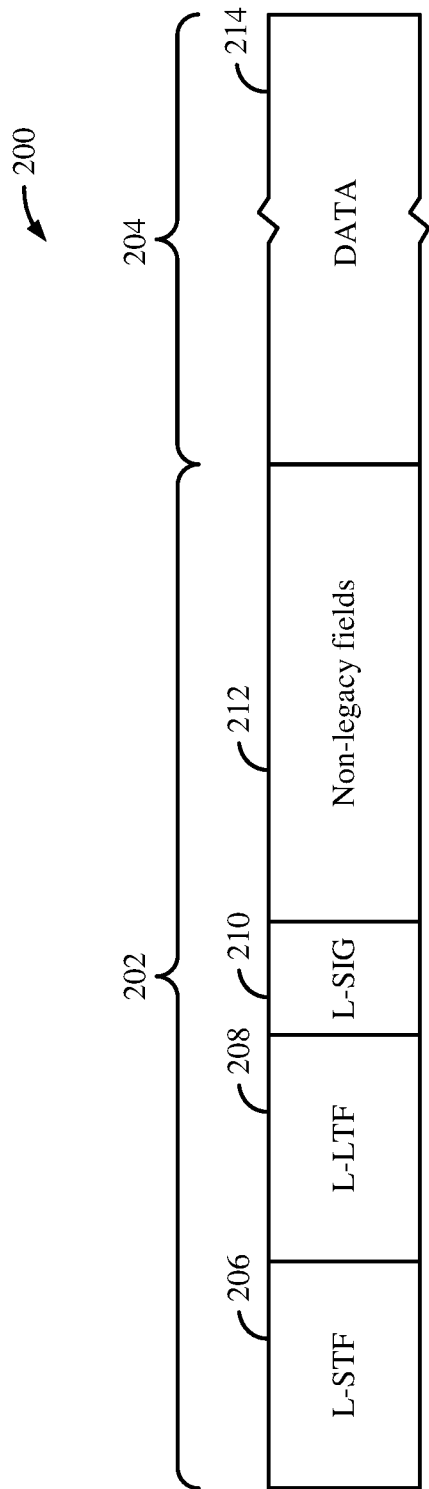
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
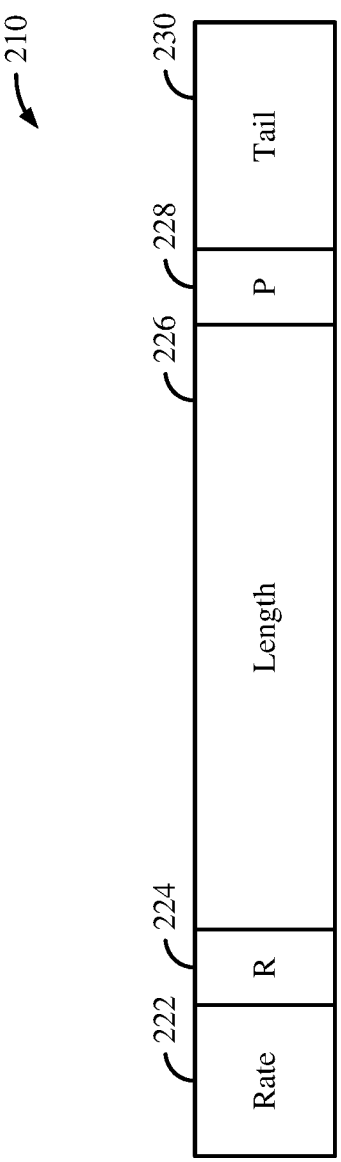
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
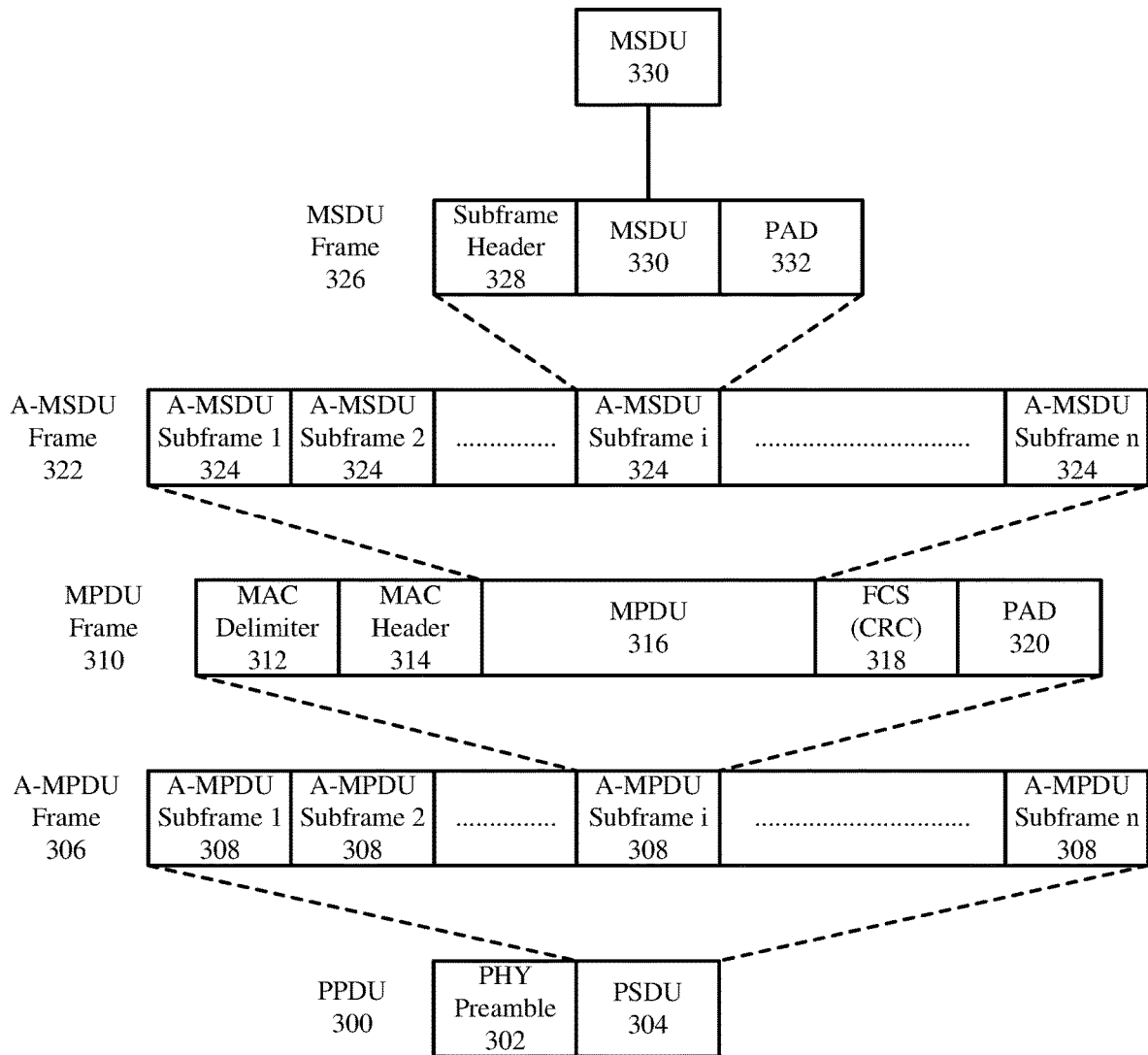
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
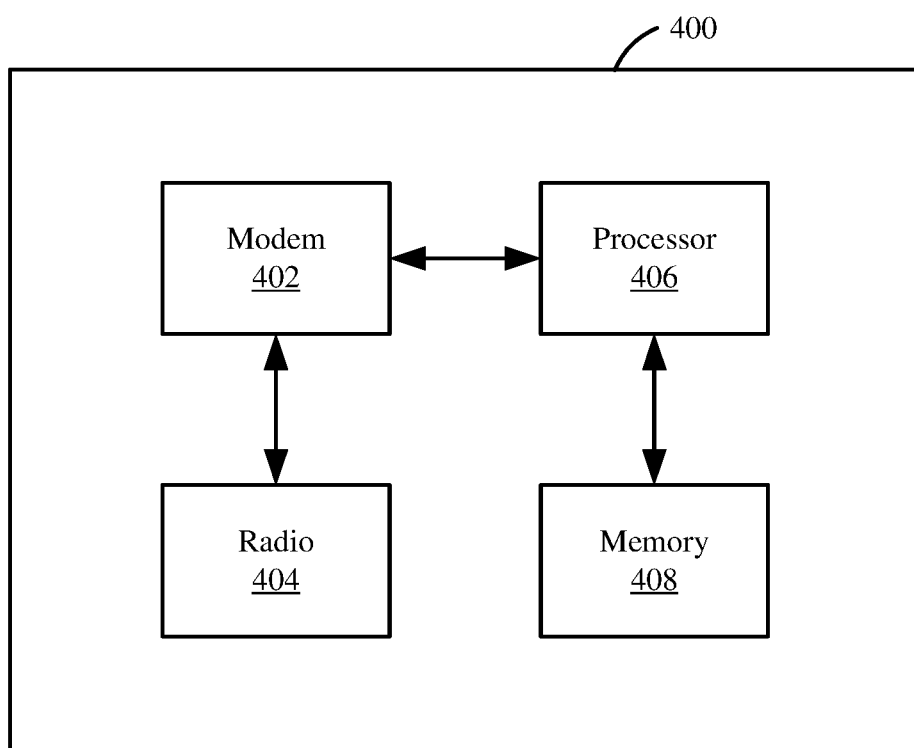
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
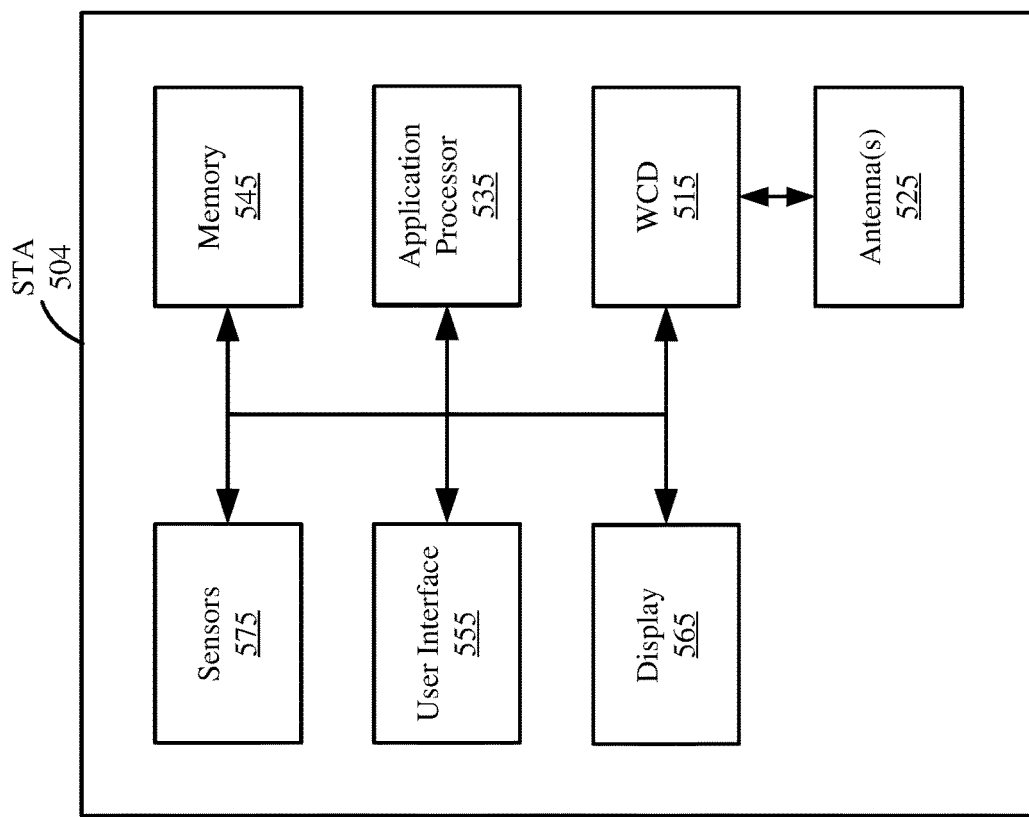
FIG. 5B shows a block diagram of an example STA.
Figure 5A:
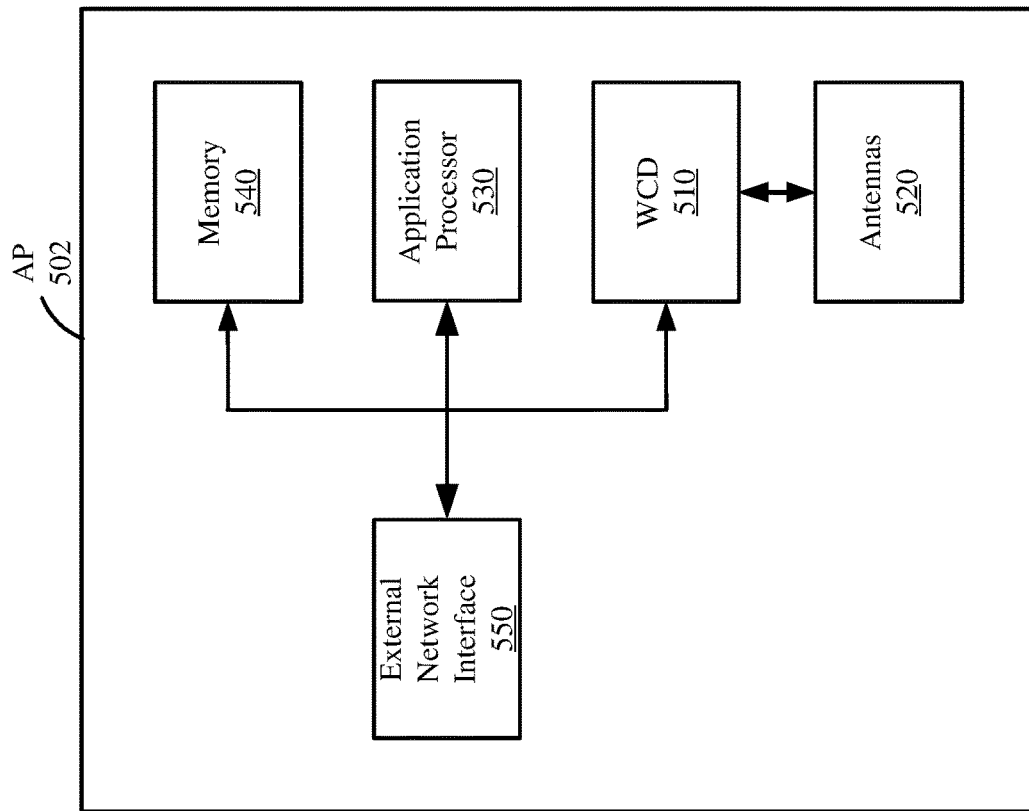
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, the IEEE 802.11bc amendment of the IEEE 802.11 standard defines an enhanced broadcast services (EBCS) protocol that provides enhanced transmission and reception of broadcast data in a BSS for associated STAs and unassociated STAs. Existing versions of the IEEE 802.11 standard define a broadcast address that can be used to signal, to all STAs associated with a BSS, that a packet carries broadcast data. However, by broadcasting EBCS DL packets using the broadcast address, an EBCS AP may cause some non-EBCS STAs to unnecessarily wake up in response to broadcast frames they cannot decode or interpret. Further, although the IEEE 802.11bc amendment allows EBCS STAs to receive EBCS DL packets in an unassociated state, there is currently no mechanism by which a STA can acknowledge receipt of DL data unless associated with the AP that transmitted the DL data. As such, an EBCS AP may not know whether any unassociated EBCS STAs fail to receive one or more EBCS DL packets associated with a given EBCS service.

Various aspects relate generally to EBCS, and more particularly, to packet designs and protocols that support reliable delivery of broadcast data associated with EBCS services to EBCS STAs and also maintain interoperability with non-EBCS STAs. For example, an AP may transmit one or more EBCS DL packets carrying data associated with an EBCS service. In some aspects, the AP may subsequently transmit a trigger frame soliciting a TB PPDU that carries information indicating which, if any, of the EBCS DL packets were missed by EBCS STAs in the vicinity. For example, each missed EBCS DL packet may be identified in the TB PPDU by a respective sequence number. The AP may then transmit or rebroadcast any missed EBCS DL packets indicated in the TB PPDU. In some other aspects, each EBCS DL packet may carry signaling indicating that the broadcast data is intended only for EBCS STAs. For example, the signaling may be carried in a header of the EBCS DL packet (such as in a PHY preamble or a MAC header). Only EBCS STAs may recognize such signaling and proceed to decode or otherwise recover the data carried in the EBCS DL packet. In contrast, non-EBCS STAs may not recognize the signaling in the header of the EBCS DL packet and may thus determine that they are not the intended recipients of the data carried therein. Still further, in some aspects, the AP may broadcast an EBCS traffic advertisement indicating a timing of the one or more EBCS DL packets. For example, the EBCS traffic advertisement may be carried in beacon frames or EBCS information frames.

Particular implementations of the subject matter described in this disclosure can be implemented to realize one or more of the following potential advantages. By soliciting a TB PPDU from EBCS STAs in response to transmitting one or more EBCS DL packets, aspects of the present disclosure may allow such EBCS STAs to provide feedback to an AP regarding the transmission of the EBCS DL packets. More specifically, an EBCS STA may use the TB PPDU to request retransmission of any EBCS DL packets which it may have missed from the previous transmission by the AP. By signaling that the EBCS DL packets carry broadcast data intended only for EBCS STAs, aspects of the present disclosure may prevent EBCS transmissions from waking up any non-EBCS STAs that may be associated with an AP but in a low power state. For example, a non-EBCS STA can quickly determine, based on the signaling in the header of an EBCS DL packet, that it is not an intended recipient and thus ignore the EBCS DL packet. By broadcasting EBCS traffic advertisements prior to the transmission of one or more EBCS DL packets, aspects of the present disclosure may support aperiodic transmissions of such EBCS DL packets. For example, an EBCS STA that receives an EBCS traffic advertisement may ensure that it is awake to receive the EBCS DL packets at the time of transmission. The EBCS traffic advertisement also allows such EBCS STAs to enter a low power state while waiting for the transmission of EBCS DL packets associated with a desired EBCS service.

Figure 6:
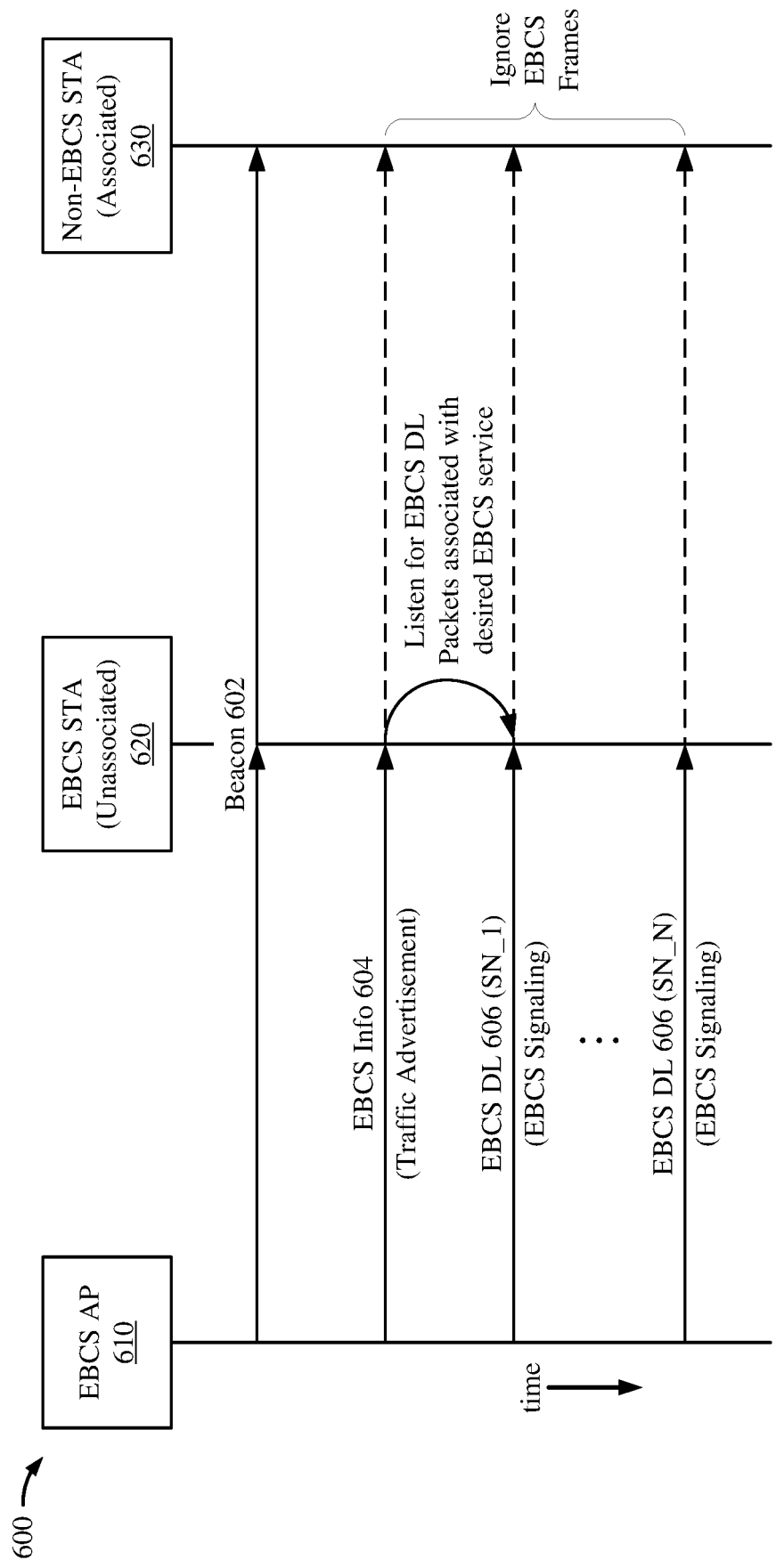
FIG. 6 shows a sequence diagram depicting an example message exchange between an AP and a number of STAs according to some implementations.

FIG. 6 shows a sequence diagram depicting an example message exchange 600 between an AP 610 and a number of STAs 620 and 630 according to some implementations. In some implementations, the AP 610 may be one example of any of the APs 102 or 502 of FIGS. 1 and 5A, respectively, and each of the STAs 620 and 630 may be one example of any of the STAs 104 or 504 of FIGS. 1 and 5B, respectively. More specifically, the AP 610 may be an EBCS AP, the STA 620 may be an EBCS STA, and the STA 630 may be a non-EBCS STA. In the example of FIG. 6, the non-EBCS STA 630 is associated with the AP 610 whereas the EBCS STA 620 is in an unassociated state. For simplicity, only one EBCS STA 620 and one non-EBC STA 630 is depicted in the example of FIG. 6. However, in actual implementations, the example message exchange 600 may be performed between the EBCS AP 610 and any number of non-EBCS STAs and any number of EBCS STAs (in an associated or unassociated state).

The EBCS AP 610 periodically broadcasts beacon frames 602 carrying information that can be used to establish or maintain a connection with the AP 610. As such, the beacon frames 602 can be received by all associated and unassociated STAs in the vicinity of the AP 610 (such as within wireless communication range), including the EBCS STA 620 and the non-EBCS STA 630. In some implementations, the beacon frames 602 may include an EBCS parameters element indicating that the EBCS AP 610 supports EBCS. For example, the EBCS parameters element may include an EBCS information (info) frame countdown indicating a timing of the next EBCS info frame to be broadcast by the EBCS AP 610 and a periodicity or frequency with which such EBCS info frames are broadcast. In some aspects, the EBCS AP 610 may broadcast EBCS info frames more frequently than beacon frames. The non-EBCS STA 630 cannot decode the EBCS parameters element and may thus be unaware that the EBCS AP 610 is capable of broadcasting EBCS frames. The EBCS STA 620 may decode the EBCS parameters element and listen for subsequent EBCS broadcasts or transmissions by the AP 610.

The EBCS AP 610 broadcasts an EBCS info frame 604 at the time indicated by the EBCS parameters element in the beacon frame 602. The EBCS info frame 604 carries information advertising one or more EBCS services provided by the AP 610. Example suitable information may include, but is not limited to, an authentication scheme, attributes (such as a title) associated with each EBCS service, information on how to subscribe to a given EBCS service, whether association is required for a given EBCS service, and when a given EBCS service may terminate (if at all). The EBCS info frame 604 is a management frame having a public action field set to a value (such as "EBCS") not recognized by non-EBCS STAs. As such, the non-EBCS STA 630 may ignore the EBCS info frame 604 broadcast by the EBCS AP 610. The EBCS STA 620 receives the EBCS info frame 604 and determines which, if any, EBCS services it would like to receive from the EBCS AP 610. The EBCS STA 620 may then listen for EBCS DL packets carrying data for the desired EBCS services.

In some aspects, the EBCS info frame 604 may include a traffic advertisement indicating a timing of one or more EBCS DL packets to be broadcast by the EBCS AP 610. For example, the traffic advertisement may be provided as a new element in the EBCS info frame 604. In some implementations, the traffic advertisement may indicate whether EBCS DL packets are broadcast periodically or aperiodically for a given EBCS service. For EBCS DL packets that are broadcast aperiodically, the traffic advertisement may further indicate a timing of such EBCS broadcasts. In some other implementations, the traffic advertisement may indicate which (if any) EBCS services provided by the EBCS AP 610 are scheduled for EBCS broadcasts during a given delivery traffic indication message (DTIM) period. For example, the traffic advertisement may include a bitmap, where each bit of the bitmap maps to a respective EBCS service (or content identifier) provided by the EBCS AP 610.

In some other aspects, the traffic advertisement may be provided in the beacon frames 602 broadcast by the EBCS AP 610. In some implementations, the traffic advertisement may utilize one or more bits of a traffic indication map (TIM) carried in each beacon frame 602. In some other implementations, the traffic advertisement may be provided as a new element (separate from the TIM element) in each beacon frame 602. Still further, in some implementations, the traffic advertisement may indicate which (if any) EBCS services provided by the EBCS AP 610 are scheduled for EBCS broadcasts during a given DTIM period. As described above, the traffic advertisement may include a bitmap, where each bit of the bitmap maps to a respective EBCS service (or content identifier) provided by the EBCS AP 610.

The AP 610 further broadcasts a number (N) of EBCS DL packets 606 carrying DL data for a particular EBCS service. Each EBCS DL packet 606 is identified by a respective sequence number in a range of sequence numbers SN_1-SN_N and carries a respective portion of the DL data for the EBCS service. For example, the sequence number may be incremented for each successive EBCS DL packet 606 associated with the same EBCS service. In some implementations, the EBCS DL packets 606 may be broadcast periodically, so that a complete set of DL data can be received during each periodic interval. In some other implementations, the EBCS DL packets 606 may be broadcast aperiodically, so that a complete set of DL data can be received only during one or more times indicated by the traffic advertisement carried in the EBCS info frame 604 (or beacon frame 602). In the example of FIG. 6, the EBCS DL packets 606 may be received by EBCS STAs in an unassociated state. Thus, the EBCS STA 620 may receive the EBCS DL packets 606 without associating with the EBCS AP 610.

Aspects of the present disclosure recognize that, without association, the EBCS AP 610 may be unaware of the presence or identity of the EBCS STA 620. Thus, to allow unassociated EBCS STAs to receive EBCS broadcasts, the EBCS DL packets 606 may be generally addressed to any EBCS STAs in the vicinity of the EBCS AP 610. For example, each EBCS DL packet 606 may include a receiver address (RA) field that is set to an address or value indicating an intended recipient of the EBCS DL packet 606. In some aspects, the RA field for each EBCS DL packet 606 may be set to a broadcast address such as defined by existing versions of the IEEE 802.11 standard. As described above, this broadcast address signals to all STAs associated with a BSS that a packet carries broadcast data. Thus, upon detecting the broadcast address in a received EBCS DL packet 606, the EBCS STA 620 may proceed to decode the broadcast data carried therein.

However, aspects of the present disclosure further recognize that because the broadcast address is known to all STAs associated with the EBCS AP 610, some non-EBCS STAs that are associated with the EBCS AP 610 may inadvertently wake up from a low-power state in response to detecting the broadcast address in EBCS broadcasts. For example, in some instances, the EBCS AP 610 may broadcast the EBCS DL packets 606 while the non-EBCS STA 630 is in a state of light sleep where the wireless communication hardware (such as the WCD 515 of FIG. 5B) is active, but the host processor (such as the application process 535 of FIG. 5B) is asleep. Upon detecting the broadcast address in an EBCS DL packet 606, the wireless communication hardware of the non-EBCS STA 630 may wake up its host processor to decode and process the broadcast data carried in the EBCS DL packet 606. However, because the non-EBCS STA 630 does not support EBCS, the non-EBCS STA 630 may waste power and processing resources attempting to decode and process the EBCS DL packets 606.

In some aspects, each EBCS DL packet 606 may carry signaling (also referred to herein as "EBCS signaling") indicating that its broadcast data is intended only for EBCS STAs. For example, the EBCS signaling may be carried in a header of each EBCS DL packet 606 (such as the PHY preamble or the MAC header) and may be designed to cause non-EBCS STAs to ignore the EBCS DL packets 606 or otherwise avoid trying to decode the broadcast data carried therein. In some implementations, the RA field of each EBCS DL packet may be set to an address that is different than the broadcast address defined by existing versions of the IEEE 802.11 standard. For example, the RA field of each EBCS DL packet 606 may be set to a special receiver address (also referred to herein as an "EBCS receiver address") that is known only to EBCS STAs. In some other implementations, each EBCS DL packet may be formatted as a management frame. As such, non-EBCS STAs may ignore EBCS DL packets broadcast by their associated APs based on the frame type of the EBCS DL packets. Still further, in some implementations, broadcast data associated with EBCS services may be transmitted on RUs specifically allocated for EBCS broadcasts. For example, such RUs may be assigned to a special STA identifier (STA-ID) value that is known only to EBCS STAs.

Figure 7:
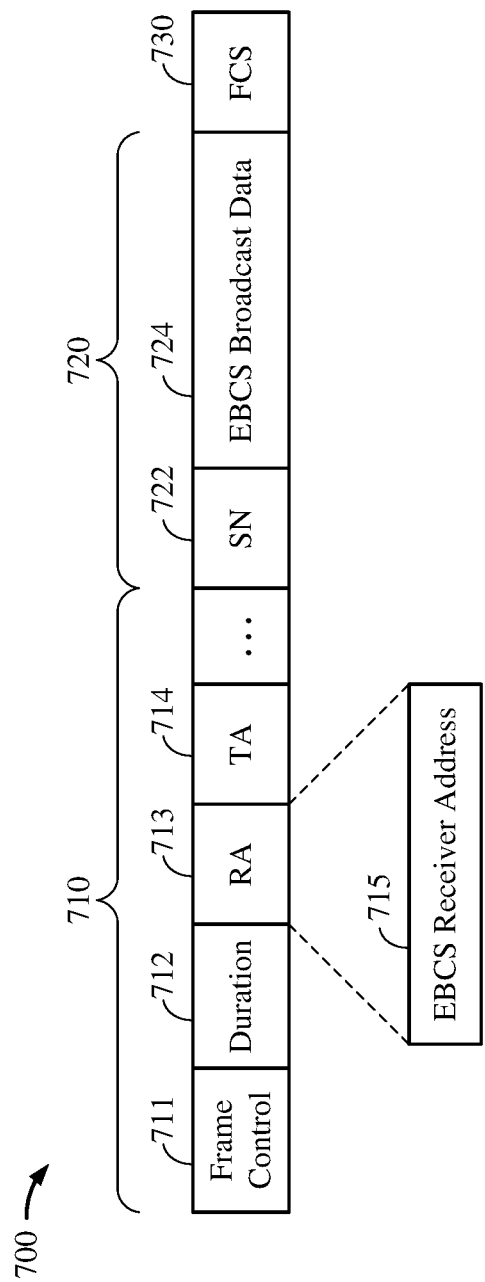
FIG. 7 shows an example enhanced broadcast services (EBCS) downlink (DL) packet usable for communications between an AP and a number of STAs according to some implementations.

FIG. 7 shows an example EBCS DL packet 700 usable for communications between an AP and a number of STAs according to some implementations. In some implementations, the EBCS DL packet 700 may be one example of any of the EBCS DL packets 606 of FIG. 6. More specifically, the EBCS DL packet 700 may be configured to carry broadcast data associated with one or more EBCS services.

The EBCS DL packet 700 includes a MAC header 710, a frame body 720, and an FCS 730. The MAC header 710 includes a frame control field 711, a duration field 712, a receiver address (RA) field 713, and a transmitter address (TA) field 714. The frame body 720 carries a sequence number (SN) 722 and EBCS broadcast data 724. As described with reference to FIG. 6, the sequence number 722 uniquely identifies the EBCS DL packet 700 among a sequence of EBCS DL packets broadcast by an EBCS AP for a given EBCS service. As such, the EBCS broadcast data 724 may represent a respective portion of the DL data associated with the EBCS service. Aspects of the present disclosure recognize that, non-EBCS STAs may not be able to decode or process the EBCS broadcast data 724. Thus, to prevent non-EBCS STAs from even attempting decode the EBCS broadcast data 724, the MAC header 710 may carry signaling indicating that the broadcast data is intended only for EBCS STAs.

In some aspects, the RA field 713 may be set to an EBCS receiver address 715 that is different than the broadcast address defined by existing versions of the IEEE 802.11 standard. In other words, the EBCS receiver address 715 may be known only to EBCS STAs or other devices that support the IEEE 802.11bc amendment of the IEEE 802.11 standard. As such, non-EBCS STAs may ignore the EBCS DL packet 700, or otherwise avoid trying to process the frame body 720, in response to detecting the EBCS receiver address 715 in the RA field 713. In some implementations, the EBCS receiver address 715 may be a generic address that can be uniformly applied by any EBCS AP to any EBCS service. For example, the EBCS receiver address 715 may be defined by the IEEE 802.11bc amendment and thus known to all wireless communication devices that support EBCS.

In some other implementations, the EBCS receiver address 715 may be unique to a particular EBCS AP. For example, each EBCS AP may specify a respective EBCS receiver address 715 to be used to indicate all EBCS DL packets originating from that EBCS AP. In such implementations, the EBCS receiver address 715 may be indicated in beacon frames, probe response frames, or EBCS info frames transmitted by the EBCS AP. Still further, in some implementations, the EBCS receiver address 715 may be unique to a particular EBCS service. For example, the host of each EBCS service (such as an EBCS AP or other device connected to a LAN) may specify a respective EBCS receiver address 715 to be used to indicate all EBCS DL packets associated with that EBCS service. The EBCS receiver address 715 associated with a particular EBCS service may be derived, for example, based on an IP or MAC address associated with the host. In such implementations, the EBCS receiver address 715 may be indicated in EBCS info frames transmitted by each EBCS AP for the given EBCS service.

By uniquely defining an EBCS receiver address 715 for a particular EBCS service, aspects of the present disclosure may allow EBCS STAs to roam seamlessly between EBCS APs that provide the same EBCS service. For example, an airport may include several EBCS APs that are configured to broadcast EBCS DL packets associated with the same EBCS service (such as flight scheduling information indicating arrival times, departure times, and gate or terminal locations associated with various flights). An EBCS STA may discover the EBCS service (and the EBCS receiver address associated therewith) based on EBCS info frames broadcast by an EBCS AP located at the entrance to the airport and may continue listening for EBCS DL packets that have the same EBCS receiver address as it moves within the airport. As such, the EBCS STA may receive uninterrupted access to updated flight scheduling information from various EBCS APs located throughout the airport.

Figure 8A:
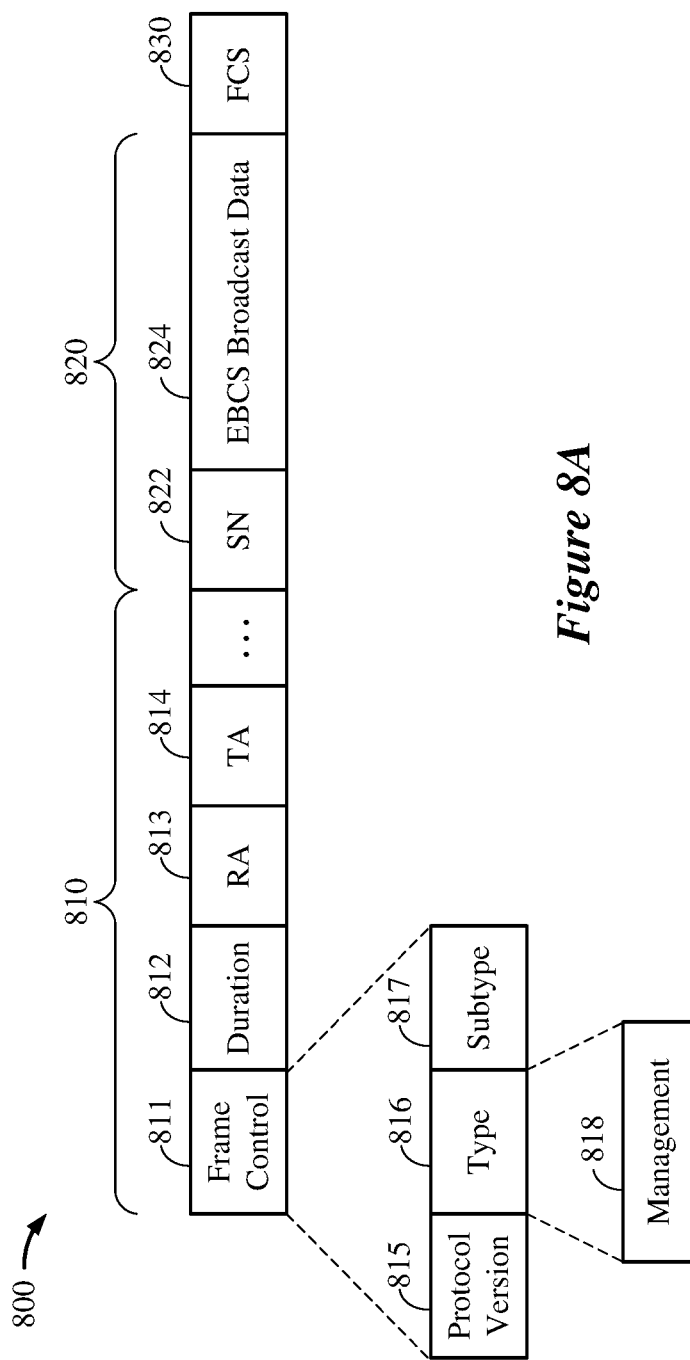
FIG. 8A shows another example EBCS DL packet usable for communications between an AP and a number of STAs according to some implementations.

FIG. 8A shows another example EBCS DL packet 800 usable for communications between an AP and a number of STAs according to some implementations. In some implementations, the EBCS DL packet 800 may be one example of any of the EBCS DL packets 606 of FIG. 6. More specifically, the EBCS DL packet 800 may be configured to carry broadcast data associated with one or more EBCS services.

The EBCS DL packet 800 includes a MAC header 810, a frame body 820, and an FCS 830. The MAC header 810 includes a frame control field 811, a duration field 812, an RA field 813, and a TA field 814. The frame control field 811 further includes a protocol version subfield 815, a type subfield 816, and a subtype subfield 817. The type subfield 816 and subtype subfield 817 collectively indicate a type of the EBCS DL packet 800. The frame body 820 carries a sequence number (SN) 822 and EBCS broadcast data 824. As described with reference to FIG. 6, the sequence number 822 uniquely identifies the EBCS DL packet 800 among a sequence of EBCS DL packets broadcast by an EBCS AP for a given EBCS service. As such, the EBCS broadcast data 824 may represent a respective portion of the DL data associated with the EBCS service. Aspects of the present disclosure recognize that non-EBCS STAs may not be able to decode or process the EBCS broadcast data 824. Thus, to prevent non-EBCS STAs from even attempting decode the EBCS broadcast data 824, the MAC header 810 may carry signaling indicating that the broadcast data is intended only for EBCS STAs.

In some aspects, the type subfield 816 may be set to a value indicating a management type 818 (such as "0000"). In other words, the EBCS DL packet 800 may be formatted as a management frame. Aspects of the present disclosure recognize that non-EBCS STAs may ignore certain types of management frames once associated with an AP (such as probe response frames, reassociation response frames, and various action frames). Further, existing versions of the IEEE 802.11 standard do not support the transmission of DL data in management frames. As such, non-EBCS STAs may ignore the EBCS DL packet 800, or otherwise avoid trying to process the frame body 820, in response to determining that the EBCS DL packet 800 is a type of management frame. In some implementations, the type of management frame may be determined based on the value of the type subfield 816 (indicating the management type 818) and information carried in one or more other fields of the EBCS DL packet 800 (such as the subtype field 817 or an action field).

Figure 8B:
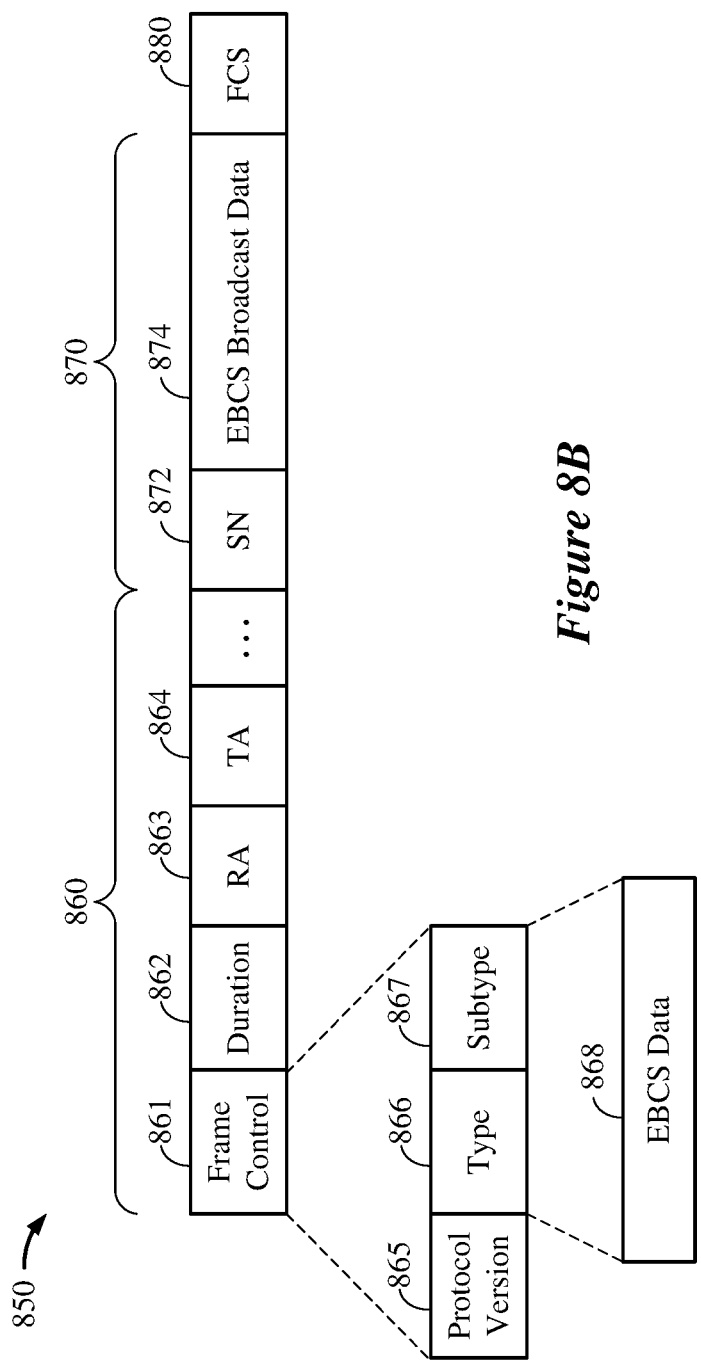
FIG. 8B shows another example EBCS DL packet usable for communications between an AP and a number of STAs according to some implementations.

FIG. 8B shows another example EBCS DL packet 850 usable for communications between an AP and a number of STAs according to some implementations. In some implementations, the EBCS DL packet 850 may be one example of any of the EBCS DL packets 606 of FIG. 6. More specifically, the EBCS DL packet 850 may be configured to carry broadcast data associated with one or more EBCS services.

The EBCS DL packet 850 includes a MAC header 860, a frame body 870, and an FCS 880. The MAC header 860 includes a frame control field 861, a duration field 862, an RA field 863, and a TA field 864. The frame control field 861 further includes a protocol version subfield 865, a type subfield 866, and a subtype subfield 867. The type subfield 866 and subtype subfield 867 collectively indicate a type of the EBCS DL packet 850. The frame body 870 carries a sequence number (SN) 872 and EBCS broadcast data 874.

As described with reference to FIG. 6, the sequence number 872 uniquely identifies the EBCS DL packet 850 among a sequence of EBCS DL packets broadcast by an EBCS AP for a given EBCS service. As such, the EBCS broadcast data 874 may represent a respective portion of the DL data associated with the EBCS service. Aspects of the present disclosure recognize that non-EBCS STAs may not be able to decode or process the EBCS broadcast data 874. Thus, to prevent non-EBCS STAs from even attempting decode the EBCS broadcast data 874, the MAC header 860 may carry signaling indicating that the broadcast data is intended only for EBCS STAs.

In some aspects, the type subfield 866 and the subtype subfield 867 may be set to values indicating a new data type 868 (referred to herein as "EBCS Data"). In other words, the EBCS DL packet 850 may be formatted as an EBCS Data frame. For example, the combination of values in the type subfield 866 and the subtype subfield 867 may be reserved or otherwise unused in existing versions of the IEEE 802.11 standard. Aspects of the present disclosure recognize that a STA will ignore frames of any type that it does not recognize or support. For example, a STA that operates in accordance with an older version of the IEEE 802.11 standard may ignore frame types that were introduced in newer versions of the IEEE 802.11 standard. As such, non-EBCS STAs may ignore the EBCS DL packet 850, or otherwise avoid trying to process the frame body 870, in response to determining that the EBCS DL packet 850 is a new or unrecognized frame type.

Figure 9:
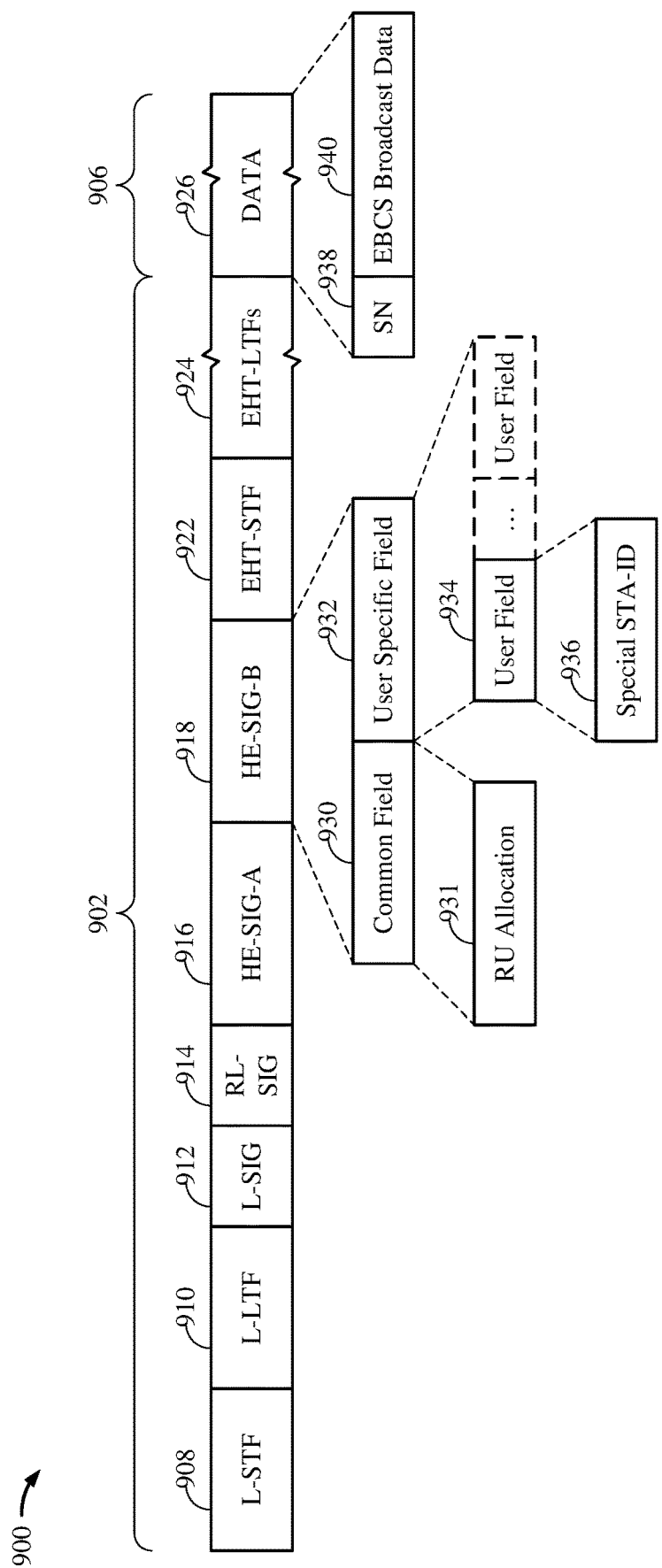
FIG. 9 shows an example PPDU usable for communications between an AP and a number of STAs according to some implementations.

FIG. 9 shows an example PPDU 900 usable for communications between an AP and a number of STAs according to some implementations. In some implementations, the PPDU 900 may be one example of any of the EBCS DL packets 606 of FIG. 6. More specifically, the PPDU 900 may be configured to carry broadcast data associated with one or more EBCS services.

The PPDU 900 includes a PHY preamble 902 and a PHY payload 906, for example, in the form of a PSDU carrying a data field 926. The PHY preamble 905 includes L-STF 908, L-LTF 910, L-SIG 912, a repeat of L-SIG (RL-SIG) 914, a high efficiency (HE) signal A field (HE-SIG-A) 916, an HE signal B field (HE-SIG-B) 918, an HE-STF 922, and a number of HE-LTFs 924. HE-SIG-B 918 further includes a common field 930 and a user specific field 932. The common field 930 carries information common to all users associated with the PPDU 900. The user specific field 932 includes one or more user fields 934 each carrying information specific for one or more users associated with the PPDU 900. More specifically, each of the user fields 934 may be identified by a respective STA-ID and may carry signaling for decoding user data associated with the STA-ID in the data field 926.

The data field 926 carries a sequence number (SN) 938 and EBCS broadcast data 940. As described with reference to FIG. 6, the sequence number 938 uniquely identifies the PPDU 900 among a sequence of EBCS DL packets broadcast by an EBCS AP for a given EBCS service. As such, the EBCS broadcast data 940 may represent a respective portion of the DL data associated with the EBCS service. Aspects of the present disclosure recognize that, non-EBCS STAs may not be able to decode or process the EBCS broadcast data 940. Thus, to prevent non-EBCS STAs from even attempting decode the EBCS broadcast data 940, the PHY preamble 902 may carry signaling indicating that the broadcast data is intended only for EBCS STAs.

In some aspects, the EBCS broadcast data 940 (and SN 938) may be transmitted on a resource unit (RU) allocated specifically for broadcast data (also referred to herein as a "broadcast RU"). For example, the common field 930 may include an RU allocation subfield 931 carrying information indicating an allocation of RUs for intended recipients of the PPDU 900. More specifically, the RU allocation subfield 931 may assign a respective RU to each user field 934 in the user specific field 932. In some implementations, at least one of the user fields 934 may be identified by a special STA-ID associated with broadcast RUs. For example, the special STA-ID may be known only to EBCS STAs or other devices that support the IEEE 802.11bc amendment of the IEEE 802.11 standard. As such, EBCS STAs may decode the EBCS broadcast data 940 from the broadcast RU based on the information carried in the user field 934 identified by the special STA-ID 936. Non-EBCS STAs may ignore any user fields 934 identified by the special STA-ID 936, and thus may not attempt to decode the EBCS broadcast data 940 transmitted on the broadcast RU.

Aspects of the present disclosure recognize that legacy STAs may not be able to interpret the RU allocation information 931 or information carried in any of the user fields 934. As used herein, the term "legacy STA" refers to any STA that does not support the IEEE 802.11ax amendment of the IEEE 802.11 standard. More specifically, legacy STAs may operate in accordance with any version of the IEEE 802.11 standard prior to the IEEE 802.11ax amendment. Because they cannot interpret the RU allocation information 931, legacy STAs may attempt to decode any information transmitted in a primary 20 MHz channel associated with the PPDU 900. In some implementations, to prevent legacy STAs from attempting to decode the EBCS broadcast data 940, the broadcast RU may be allocated outside the primary 20 MHz channel associated with the PPDU 900.

As described above with reference to FIGS. 6-9, each EBCS DL packet associated with a given EBCS service is identified by a respective sequence number in a range of sequence numbers. Thus, to obtain a complete set of DL data for the EBCS service, an EBCS STA must receive a respective EBCS DL packet for each sequence number in the range of sequence numbers associated with the EBCS service. However, depending on the locations of the EBCS STAs and the conditions on the wireless medium, one or more of the EBCS STAs may miss or otherwise fail to receive one or more of the EBCS DL packets. As described above, existing versions of the IEEE 802.11 standard do not provide a mechanism by which unassociated STAs can acknowledge receipt of packets transmitted by an AP or request retransmission of missed packets.

In some aspects, after broadcasting a series of EBCS DL packets associated with a given EBCS service, an EBCS AP may solicit feedback from EBCS STAs in its vicinity regarding which, if any, of the EBCS DL packets were missed by an EBCS STAs that received one or more of the EBCS DL packets. In some implementations, the EBCS AP may transmit a trigger frame carrying EBCS soliciting information indicating a range of sequence numbers associated with the EBCS service. The trigger frame solicits a trigger-based (TB) PPDU from EBCS STAs that expect to receive broadcast data associated with the EBCS service. In some implementations, such EBCS STAs may respond to the trigger frame by transmitting a TB PPDU carrying EBCS solicited information indicating which, if any, of the sequence numbers were missed. The EBCS AP may subsequently transmit (or rebroadcast) any missed EBCS DL packets identified by respective sequence numbers in the TB PPDU.

Figure 10:
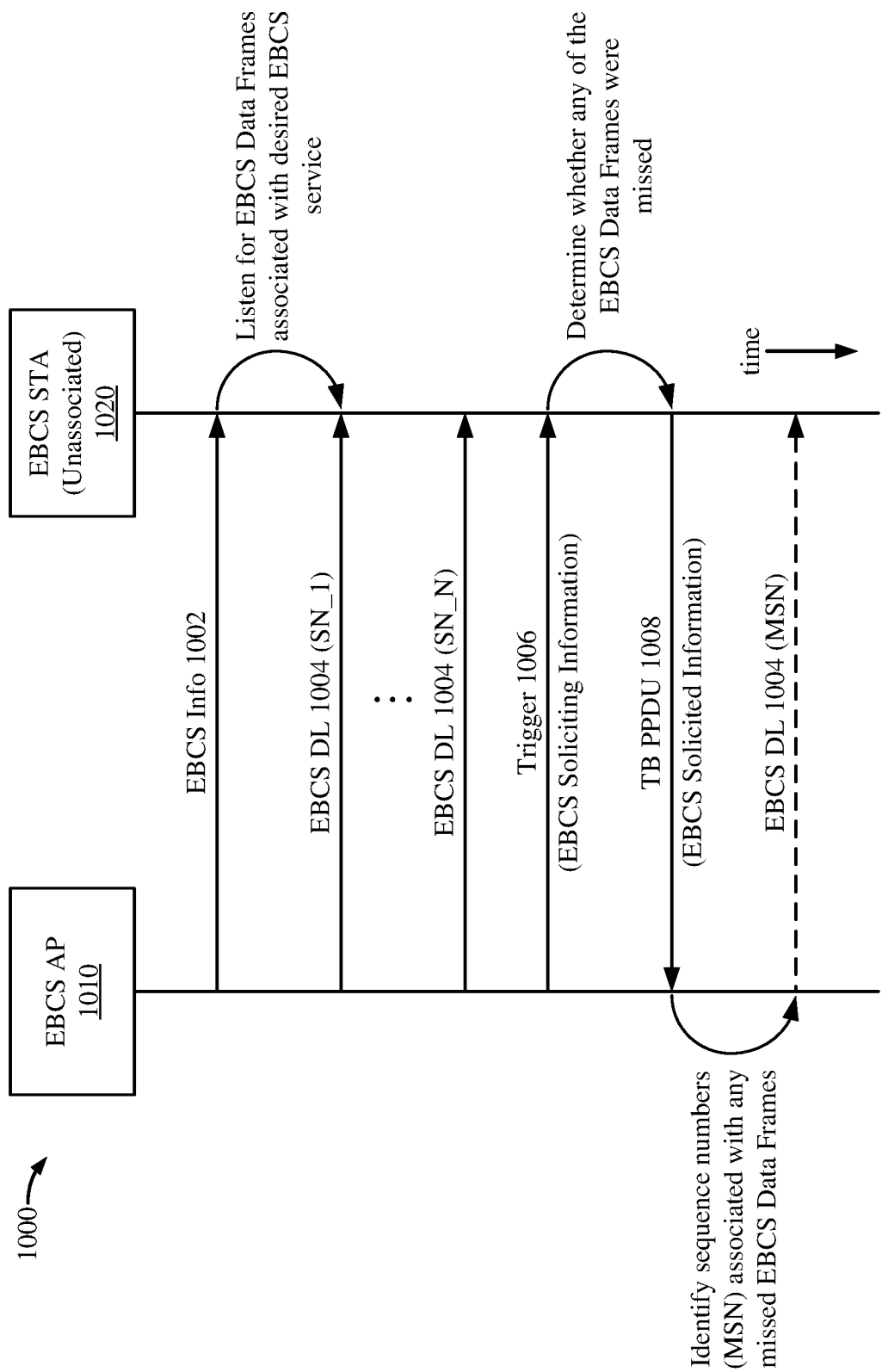
FIG. 10 shows a sequence diagram depicting an example message exchange between an AP and a STA according to some implementations.

FIG. 10 shows a sequence diagram depicting an example message exchange 1000 between an AP 1010 and a STA 1020 according to some implementations. In some implementations, the AP 1010 may be one example of any of the APs 102 or 502 of FIGS. 1 and 5A, respectively, and the STA 1020 may be one example of any of the STAs 104 or 504 of FIGS. 1 and 5B, respectively. More specifically, the AP 1010 may be an EBCS AP and the STA 1020 may be an EBCS STA. In the example of FIG. 10, the EBCS STA 1020 is in an unassociated state. For simplicity, only one EBCS STA 1020 is depicted in the example of FIG. 10. However, in actual implementations, the example message exchange 1000 may be performed between the EBCS AP 1010 and any number of EBCS STAs (in an associated or unassociated state).

The EBCS AP 1010 broadcasts an EBCS info frame 1002 carrying information advertising one or more EBCS services provided by the AP 1010. Example suitable information may include, but is not limited to, an authentication scheme, attributes (such as a title) associated with each EBCS service, information on how to subscribe to a given EBCS service, whether association is required for a given EBCS service, and when a given EBCS service may terminate (if at all). In some implementations, the EBCS AP 1010 may periodically broadcast EBCS info frames 1002. The EBCS STA 1020 receives the EBCS info frame 1002 and determines which, if any, EBCS services it would like to receive from the EBCS AP 1010. The EBCS STA 1020 may then listen for EBCS DL packets broadcast by the EBCS AP 1010 for the desired EBCS services.

In some aspects, the EBCS info frame 1002 may include a traffic advertisement indicating a timing of one or more EBCS DL packets to be broadcast by the EBCS AP 1010. For example, the traffic advertisement may be provided as a new element in the EBCS info frame 1002. In some implementations, the traffic advertisement may indicate whether EBCS DL packets are broadcast periodically or aperiodically for a given EBCS service. For EBCS DL packets that are broadcast aperiodically, the traffic advertisement may further indicate a timing of such EBCS broadcasts. In some other aspects, the traffic advertisement may be provided in beacon frames broadcast by the EBCS AP 1010 (not shown for simplicity). As described with reference to FIG. 6, the traffic advertisement may utilize one or more bits of a TIM carried in each beacon frame or may be provided as a new element in each beacon frame.

The AP 1010 further broadcasts a number (N) of EBCS DL packets 1004 carrying DL data for a particular EBCS service. Each EBCS DL packet 1004 is identified by a respective sequence number in a range of sequence numbers SN_1-SN_N and carries a respective portion of the DL data for the EBCS service. For example, the sequence number may be incremented for each successive EBCS DL packet 1004 associated with the same EBCS service. In some implementations, the EBCS DL packets 1004 may be broadcast periodically, so that a complete set of DL data can be received during each periodic interval. In some other implementations, the EBCS DL packets 1004 may be broadcast aperiodically, so that a complete set of DL data can be received only during one or more times indicated by the traffic advertisement carried in the EBCS info frame 604 (or a beacon frame). In the example of FIG. 10, the EBCS DL packets 1004 may be received by EBCS STAs in an unassociated state. Thus, the EBCS STA 1020 may receive the EBCS DL packets 1004 without associating with the EBCS AP 1010.

In some implementations, the EBCS AP 1010 may transmit a trigger frame 1006 following the broadcast of the EBCS DL packets 1004 to solicit feedback regarding the EBCS broadcast. More specifically, the trigger frame 1006 solicits a TB PPDU 1008 from EBCS STAs in the vicinity of the EBCS AP 1010 and allocates resources in a data field of the TB PPDU 1008 for providing the feedback. In some aspects, the trigger frame 1006 may carry EBCS soliciting information indicating a mapping of the sequence numbers SN_1-SN_N to the resources allocated in the data field of the TB PPDU 1008. For example, each of the sequence numbers SN_1-SN_N may be mapped to a corresponding portion of the bandwidth of the TB PPDU 1008.

In some implementations, the trigger frame 1006 may allocate a range of tones spanning the bandwidth of the TB PPDU 1008 for carrying the feedback regarding the EBCS broadcast. In such implementations, each of the sequence numbers SN_1-SN_N may be mapped to a respective tone in the range of tones so that each tone carries feedback for a particular EBCS DL packet 1004. In some other implementations, the trigger frame 1006 may allocate one or more RUs or multiple RUs (MRUs) for carrying the feedback regarding the EBCS broadcast. In such implementations, a respective subset of the sequence numbers SN_1-SN_N may be mapped to each RU or MRU so that each RU or MRU carries feedback for a range of EBCS DL packets 1004.

The EBCS STA 1020 receives the trigger frame 1006 and determines, based on the EBCS soliciting information, whether it missed one or more of the EBCS DL packets 1004 broadcast by the EBCS AP 1010. For example, the EBCS STA 1020 may detect missed EBCS DL packets by comparing the sequence numbers of received EBCS DL packets 1004 with the range of sequence numbers SN_1-SN_N indicated by the EBCS soliciting information. The EBCS STA 1020 may respond to the trigger frame 1006 by transmitting a TB PPDU 1008 carrying EBCS solicited information back to the EBCS AP 1010. The EBCS solicited information may indicate which, if any, of the EBCS DL packets 1004 were missed by the EBCS STA 1020 (as identified by their respective sequence numbers).

In some implementations, the EBCS solicited information may include N values modulated on N tones, respectively, in the data field of the TB PPDU 1008. In such implementations, the EBCS STA 1020 may modulate each of the N tones with a value (such as 0 or 1) indicating whether it received or missed the EBCS DL packet 1004 associated with the sequence number that maps to the tone. In some other implementations, the EBCS solicited information may include one or more values modulated on one or more RUs (or MRUs), respectively, in the data field of the TB PPDU 1008. In such implementations, the EBCS STA 1020 may modulate each of the RUs (or MRUs) with a value indicating whether it received or missed one or more EBCS DL packets 1004 associated with the subset of sequence numbers that maps to the RU (or MRU).

In some implementations, the EBCS STA 1020 may transmit a first value (such as 0) or a second value (such as a value greater than 0) on each RU of the TB PPDU 1008. For example, the first value may indicate that the EBCS STA 1020 received all the sequence numbers which map to a given RU, whereas the second value may indicate that the EBCS STA 1020 missed at least one of the sequence numbers which map to a given RU. In some other implementations, the EBCS STA 1020 may transmit more complex information on one or more of the RUs of the TB PPDU 1008. For example, the EBCS STA 1020 may transmit a quality of service (QoS) null frame on a given RU to indicate that it missed at least one of the sequence numbers which map to that RU and may not transmit any information on a given RU if it received all the sequence numbers which map to that RU.

The EBCS AP 1010 receives the TB PPDU 1008 and determines, based on the EBCS solicited information, whether any of the EBCS DL packets 1004 were missed by one or more EBCS STAs. For example, the EBCS AP 1010 may identify missed EBCS DL packets based on the values modulated in the data field, on respective portions of the bandwidth of the TB PPDU 1008, and the mapping of the sequence numbers SN_1-SN_N to each portion of bandwidth. More specifically, missed EBCS DL packets may be identified by their respective sequence numbers (referred to herein as "missed sequence numbers"). If the EBCS solicited information indicates one or more missed sequence numbers (MSN), the EBCS AP 1010 may subsequently transmit (or rebroadcast) the EBCS DL packets 1004 identified by the missed sequence numbers.

In some implementations, the EBCS AP 1010 may transmit a respective EBCS DL packet 1004 for each tone in the data field of the TB PPDU 1008 modulated with a value associated with missed EBCS DL packets. For example, if a tone which maps to the $N^{th}$ sequence number (SN_N) is modulated with a value equal to 1, the EBCS AP 1010 may rebroadcast the $N^{th}$ EBCS DL packet 1004 (identified by SN_N) in the series. In some other implementations, the EBCS AP 1010 may transmit a range of EBCS DL packets 1004 for each RU (or MRU) in the data field of the TB PPDU 1008 modulated with a value associated with missed EBCS DL packets. For example, if QoS null frame is transmitted on an RU which maps to the first three sequence numbers (SN_1-SN_3), the EBCS AP 1010 may rebroadcast the first three EBCS DL packets 1004 (identified by SN_1-SN_3) in the series.

Figure 11:
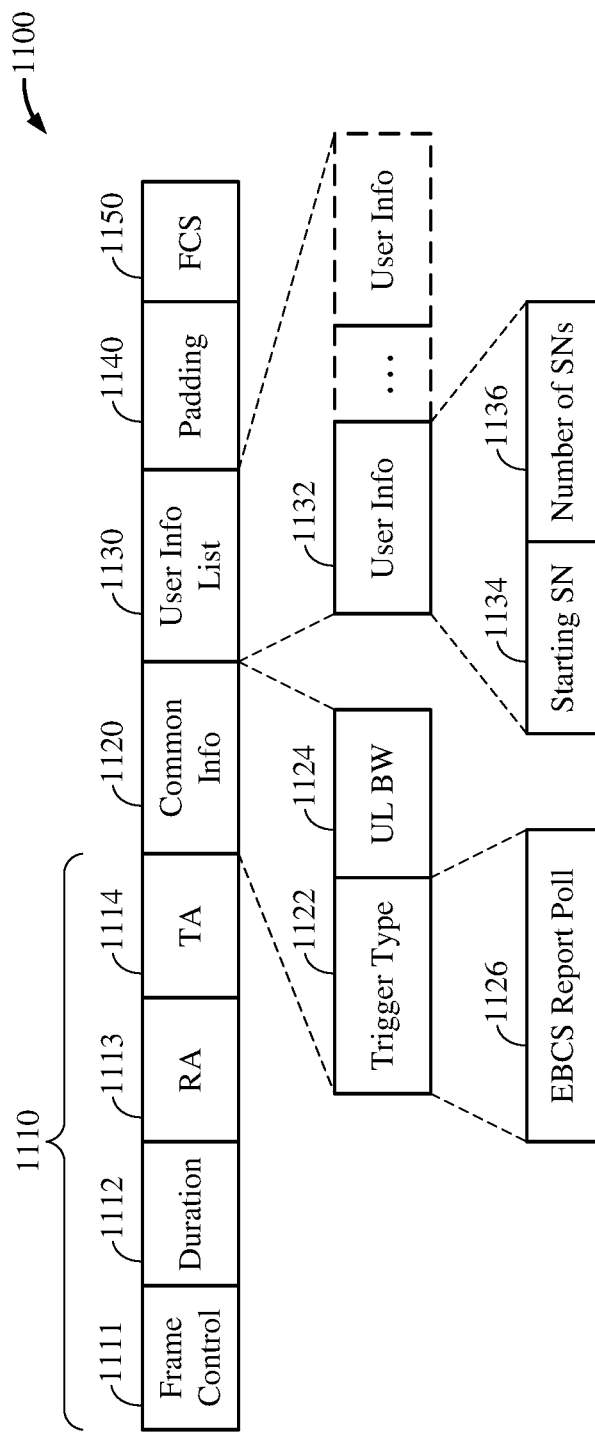
FIG. 11 shows an example trigger frame usable for communications between an AP and a number of STAs according to some implementations.

FIG. 11 shows an example trigger frame 1100 usable for communications between an AP and a number of STAs according to some implementations. The trigger frame 1100 may be transmitted by an EBCS AP to solicit a TB PPDU from one or more EBCS STAs. In some implementations, the trigger frame 1100 may be one example of the trigger frame 1006 of FIG. 10. Thus, the trigger frame 1100 may be used to solicit feedback (such as EBCS solicited information) regarding an EBCS broadcast.

The trigger frame 1100 includes a MAC header 1110, a common information field 1120, a user information list 1130, zero or more padding bits 1140, and an FCS 1150. The MAC header 1110 includes a frame control field 1111, a duration field 1112, an RA field 1113, and a TA field 1114. The common information field 1120 and user information list 1130 carry configuration information which may be used by a receiving device to configure a TB PPDU to be transmitted in response to receiving the trigger frame 1100. The common field 1120 includes a trigger type subfield 1122 which carries information identifying a trigger frame variant and an uplink bandwidth (UL BW) subfield 1124 which carries bandwidth information indicating a bandwidth of the TB PPDU. In some implementations, the trigger type subfield 1122 may be set to a value associated with EBCS. For example, the trigger type subfield 1122 may indicate that the format of the trigger frame 1100 conforms to an EBCS report poll variant 1126.

The user information list 1130 includes one or more user information fields 1132 each carrying EBCS soliciting information indicating a respective allocation of resources for the data portion of the TB PPDU. In some implementations, the EBCS soliciting information may be carried in a starting SN subfield 1134 and a number of SNs subfield 1136. The starting SN subfield 1134 may be set to a value indicating the sequence number associated with the first EBCS DL packet in a series of EBCS DL packets broadcast for a given EBCS service. The number of SNs subfields 1136 may be set to a value indicating the total number of sequence numbers associated with the EBCS service. In other words, the starting SN subfield 1134 and the number of SNs subfield 1136 may collectively describe a range of sequence numbers associated with a given EBCS service. With reference for example to FIG. 10, the trigger frame 1006 may include a user information field having a starting SN subfield set to a value indicating "SN_1" and a number of SNs subfield set to a value indicating "N."

In the example of FIG. 11, the trigger frame 1100 may allocate a range of tones for carrying the EBCS solicited information in the data field of the TB PPDU. For example, the range of tones may span the bandwidth of the TB PPDU (as indicated by the UL BW subfield 1124). In some implementations, each sequence number in the range of sequence numbers indicated by the starting SN subfield 1134 and the number of SNs subfield 1136 may map to a respective tone in the data field of the TB PPDU. For example, an 80 MHz PPDU bandwidth includes 72 usable tones that can be mapped to 72 sequence numbers, respectively (N=72). In some implementations, the sequence number indicated by the starting SN subfield 1134 may map to the lowest (or highest) tone in the range of tones and each successive sequence number may map to a respective tone that is immediately above (or below) the tone mapped to the previous sequence number.

An EBCS STA that receives the trigger frame 1100 may determine, based on the information in the trigger type subfield 1122, that the solicited TB PPDU is to carry EBCS solicited information associated with an EBCS service. The EBCS STA may determine the range of sequence numbers associated with the EBCS service based on the values of the starting SN subfield 1134 and the number of SNs subfield 1136. The EBCS STA also may determine a mapping of the sequence numbers to a range of tones spanning the data field of the TB PPDU based on the bandwidth indicated by the UL BW subfield 1124. In some implementations, the EBCS STA may modulate each tone in the data field with a value equal to 0 or 1 based on whether the EBCS STA missed a respective EBCS DL packet identified by the sequence number that maps to the tone. As such, tones which map to missed sequence numbers may be modulated with a value equal to 1 whereas tones which map to received sequence numbers may be modulated with a value equal to 0 (or otherwise left unmodulated).

Aspects of the present disclosure recognize that multiple EBCS STAs may concurrently respond to the trigger frame 1100. Thus, the TB PPDU received by an EBCS AP may include EBCS solicited information from multiple STAs superimposed upon one another. With reference for example to FIG. 10, if multiple EBCS STAs missed the $N^{th}$ EBCS DL packet 1004, the EBCS AP 1010 may detect a value of 1 modulated on a respective tone in the data field of the TB PPDU 1008 that maps to SN_N. If at least one EBCS STA missed the $N^{th}$ EBCS DL packet 1004 and at least one EBCS STA received the $N^{th}$ EBCS DL packet 1004, the EBCS AP 1010 also may detect a value of 1 modulated on the tone in the data field of the TB PPDU 1008 that maps to SN_N. However, if no EBCS STAs in the vicinity of the EBCS AP 1010 missed the $N^{th}$ EBCS DL packet 1004, the EBCS AP 1010 may detect a value of 0 modulated on the tone in the data field of the TB PPDU 1008 that maps to SN_N.

Figure 12:
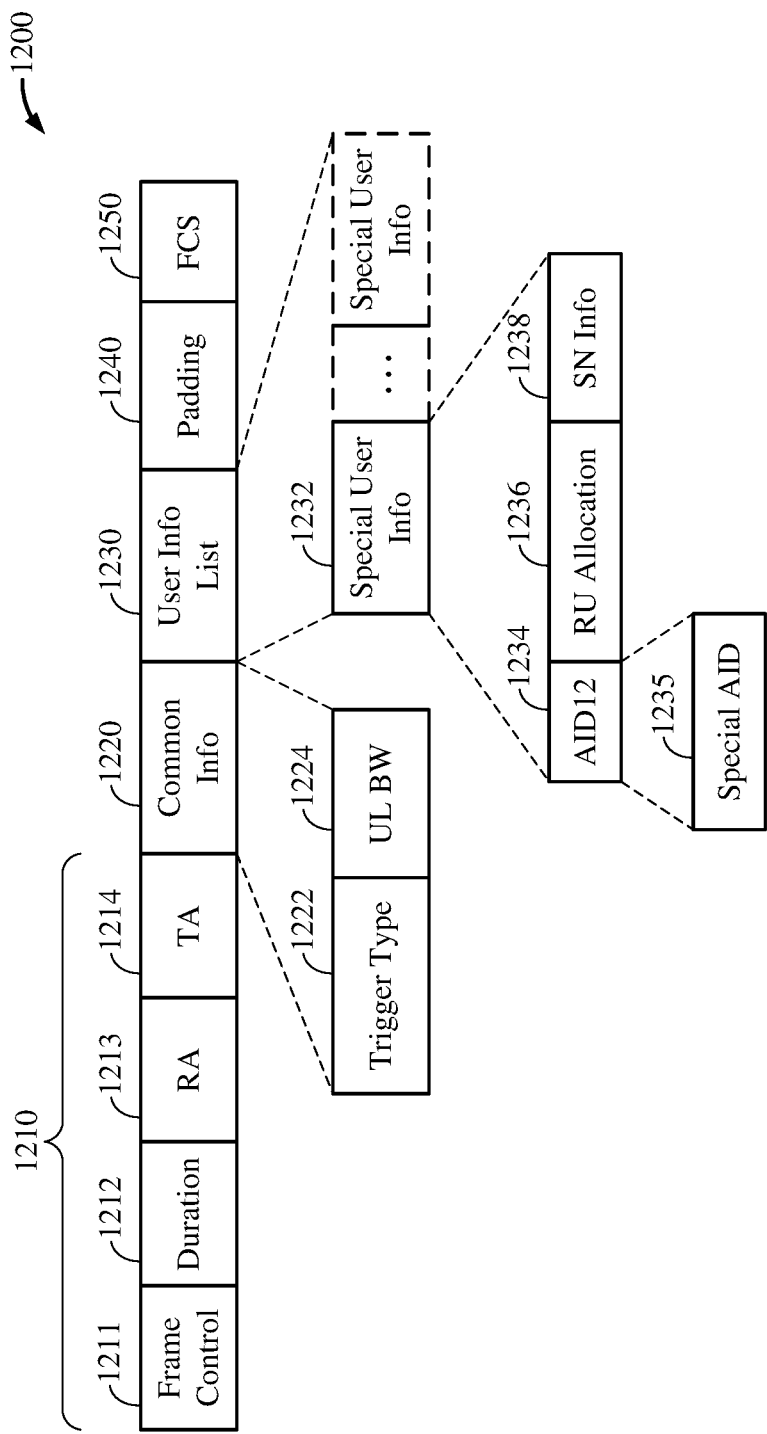
FIG. 12 shows another example trigger frame usable for communications between an AP and a number of STAs according to some implementations.

FIG. 12 shows another example trigger frame 1200 usable for communications between an AP and a number of STAs according to some implementations. The trigger frame 1200 may be transmitted by an EBCS AP to solicit a TB PPDU from one or more EBCS STAs. In some implementations, the trigger frame 1200 may be one example of the trigger frame 1006 of FIG. 10. Thus, the trigger frame 1200 may be used to solicit feedback (such as EBCS solicited information) regarding an EBCS broadcast.

The trigger frame 1200 includes a MAC header 1210, a common information field 1220, a user information list 1230, zero or more padding bits 1240, and an FCS 1250. The MAC header 1210 includes a frame control field 1211, a duration field 1212, an RA field 1213, and a TA field 1214. The common information field 1220 and user information list 1230 carry configuration information which may be used by a receiving device to configure a TB PPDU to be transmitted in response to receiving the trigger frame 1200. The common information field 920 carries information that is common to all recipients of the trigger frame 1200. For example, the common field 1220 may include a trigger type subfield 1222 which carries information identifying a trigger frame variant and a UL BW subfield 1224 which carries bandwidth information indicating a bandwidth of the TB PPDU.

The user information list 1230 may include one or more user information fields. Each user information field in the user information list 1230 can be up to 48 bits in length, which includes a 12-bit association identifier (AID12) subfield. In some implementations, at least one of the user information fields in the user information list 1230 may be a special user information field 1232 having an AID12 subfield 1234 set to a special AID value 1235 that is not assigned to any STAs associated with the EBCS AP transmitting the trigger frame 1200. For example, the special AID value 1235 may be a reserved value (such as 2044) in existing versions of the IEEE 802.11 standard. When the AID subfield 1234 is set to the special AID value 1235, the remaining (36) bits of the user information field may be repurposed to carry EBCS soliciting information indicating a respective allocation of resources for the data portion of the TB PPDU.

In some implementations, the EBCS soliciting information may be carried in an RU allocation subfield 1236 and an SN information subfield 1238. The RU allocation subfield 1236 may allocate an RU (or MRU) for transmission in the data field of the TB PPDU. The SN information subfield 1238 indicates a subset of sequence numbers assigned to the RU indicated by the RU allocation subfield 1236. In some implementations, each RU may be assigned to a respective sequence number. With reference for example to FIG. 10, the trigger frame 1006 may include N special user information fields each allocating an RU for a respective sequence number in the range of sequence numbers SN_1-SN_N. In some other implementations, each RU may be assigned to a respective range of sequence numbers. With reference for example to FIG. 10, the trigger frame 1006 may include a number (M) of special user information fields each assigning N/M sequence numbers to a respective RU. For example, the first special user information field of the trigger frame 1006 may allocate an RU for the first three sequence numbers (SN_1-SN_3).

An EBCS STA that receives the trigger frame 1200 may determine, based on the values of the AID12 subfields 1234 of the special user information fields 1232, that the solicited TB PPDU is to carry EBCS solicited information associated with an EBCS service. The EBCS STA may determine the range of sequence numbers associated with the EBCS service based on the SN information subfields 1238 of the special user information fields 1232. The EBCS STA also may determine a mapping of the sequence numbers to one or more RUs (or MRUs) allocated for transmission in the data field of the TB PPDU based on the RU allocation subfields 1236 of the special user information fields 1232. In some implementations, the EBCS STA may modulate each RU in the data field with a value indicating whether the EBCS STA missed one or more EBCS DL packets associated with the subset of sequence numbers that map to the RU. For example, QoS null frames may be transmitted on RUs that map to at least one missed sequence number whereas no information may be transmitted on RUs that map exclusively to received sequence numbers.

Aspects of the present disclosure recognize that multiple EBCS STAs may concurrently respond to the trigger frame 1200. Thus, the TB PPDU received by an EBCS AP may include EBCS solicited information from multiple STAs superimposed upon one another. With reference for example to FIG. 10, the first three sequence numbers (SN_1-SN_3) may map to a first RU (RU-1) in the data field of the TB PPDU 1008. If at least one EBCS STA missed the first EBCS DL packet 1004 (identified by SN_1) and at least one EBCS STA missed the second EBCS DL packet 1004 (identified by SN_2), the EBCS AP 1010 may detect a value of 1 modulated on RU-1. If at least one EBCS STA missed the first EBCS DL packet 1004 (identified by SN_1), but not EBCS STAs missed any of the second or third EBCS DL packets 1004 (identified by SN_2 and SN_3), the EBCS AP 1010 also may detect a value of 1 modulated on RU-1. However, if no EBCS STAs in the vicinity of the EBCS AP 1010 missed any of the first three EBCS DL packets 1004 (identified by SN_1-SN_3), the EBCS AP 1010 may detect a value of 0 modulated on RU-1.

Figure 13:
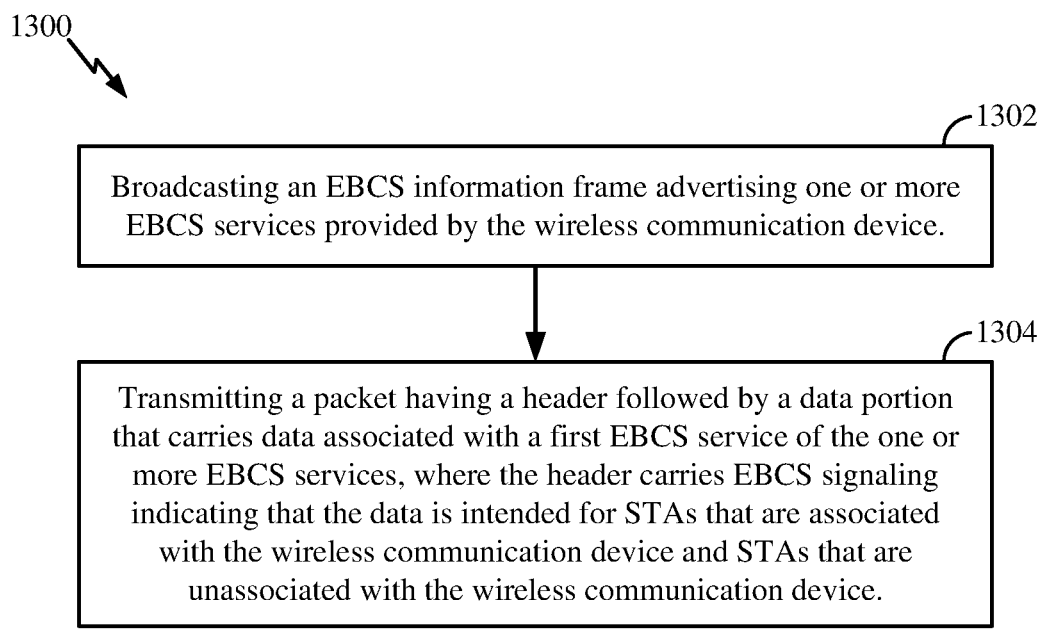
FIG. 13 shows a flowchart illustrating an example process for EBCS DL broadcasts according to some implementations.

FIG. 13 shows a flowchart illustrating an example process 1300 for EBCS downlink broadcasts according to some implementations. In some implementations, the process 1300 may be performed by a wireless communication device operating as or within an AP, such as one of the APs 102 or 502 described above with reference to FIGS. 1 and 5A, respectively.

In some implementations, the process 1300 begins in block 1302 with broadcasting an EBCS information frame advertising one or more EBCS services provided by the wireless communication device. In some implementations, the EBCS information frame may further carry a traffic advertisement indicating a timing of data transmissions associated with each of the one or more EBCS services, where the traffic advertisement includes a bitmap indicating which of the one or more EBCS services are scheduled for data transmissions during a respective DTIM period.

In block 1304, the process 1300 proceeds with transmitting a packet having a header followed by a data portion that carries data associated with a first EBCS service of the one or more EBCS services, where the header carries EBCS signaling indicating that the data is intended for STAs that are associated with the wireless communication device and STAs that are unassociated with the wireless communication device. In some aspects, the EBCS signaling may be carried in a MAC header that includes an RA field and a frame control field having type and subtype subfields, where the type and subtype subfields collectively indicate a type of the packet. In some implementations, the EBCS signaling may include values carried in the type and subtype subfields indicating that the packet is an EBCS Data frame.

In some other implementations, the EBCS signaling may include an EBCS receiver address, carried in the RA field, that is different than a broadcast address which identifies packets broadcast to all users associated with the wireless communication device. In some implementations, the EBCS receiver address may be known to STAs that support EBCS. In some other implementations, the EBCS receiver address may be the same for each of the one or more EBCS services provided by the wireless communication device. Still further, in some implementations, the EBCS receiver address may be unique to the first EBCS service. In such implementations, the EBCS receiver address may be derived from a MAC address or an IP address of a host device that hosts the first EBCS service.

In some implementations, the method may further include broadcasting a beacon frame carrying a traffic advertisement indicating a timing of data transmissions associated with each of the one or more EBCS services. In some implementations, the traffic advertisement may include a bitmap indicating which of the one or more EBCS services are scheduled for data transmissions during a respective DTIM period. In some implementations, the traffic advertisement may be carried in a new element of the beacon frame that is different than a TIM element.

Figure 14:
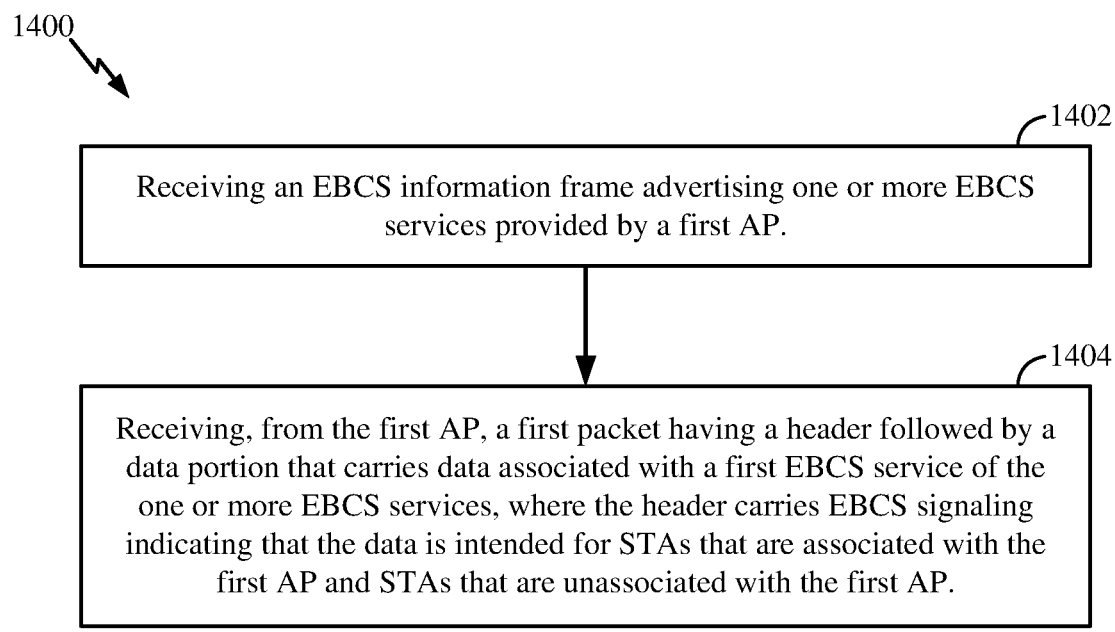
FIG. 14 shows a flowchart illustrating an example process for EBCS DL broadcasts according to some implementations.

FIG. 14 shows a flowchart illustrating an example process 1400 for EBCS downlink broadcasts according to some implementations. In some implementations, the process 1400 may be performed by a wireless communication device operating as or within a network node, such as one of the STAs 104 or 504 described above with reference to FIGS. 1 and 5B, respectively.

In some implementations, the process 1400 begins in block 1402 with receiving an EBCS information frame advertising one or more EBCS services provided by a first AP. In some implementations, the EBCS information frame may further carry a traffic advertisement indicating a timing of data transmissions associated with each of the one or more EBCS services, where the traffic advertisement includes a bitmap indicating which of the one or more EBCS services are scheduled for data transmissions during a respective DTIM period. In such implementations, the wireless communication device may further wake up from a low-power state based on the timing of the data transmissions indicated by the traffic advertisement.

In block 1404, the process 1400 proceeds with receiving, from the first AP, a first packet having a header followed by a data portion that carries data associated with a first EBCS service of the one or more EBCS services, where the header carries EBCS signaling indicating that the data is intended for STAs that are associated with the first AP and STAs that are unassociated with the first AP. In some aspects, the EBCS signaling may be carried in a MAC header that includes an RA field and a frame control field having type and subtype subfields, where the type and subtype subfields collectively indicate a type of the first packet. In some implementations, the EBCS signaling may include values carried in the type and subtype subfields indicating that the first packet is an EBCS Data frame.

In some other implementations, the EBCS signaling may include an EBCS receiver address, carried in the RA field, that is different than a broadcast address which identifies packets broadcast to all users associated with the wireless communication device. In some implementations, the EBCS receiver address may be known to the wireless communication device. In some other implementations, the EBCS receiver address may be the same for each of the one or more EBCS services provided by the wireless communication device. Still further, in some implementations, the EBCS receiver address may be unique to the first EBCS service. In such implementations, the wireless communication device may further receive, from a second AP, a second packet carrying data associated with the first EBCS service, where the second packet has an RA field set to the EBCS receiver address.

In some implementations, the wireless communication device may further receive, from the first AP, a beacon frame carrying a traffic advertisement indicating a timing of data transmissions associated with each of the one or more EBCS services; and wake from a low-power state based on the timing of the data transmissions indicated by the traffic advertisement. In some implementations, the traffic advertisement may include a bitmap indicating which of the one or more EBCS services are scheduled for data transmissions during a respective DTIM period. In some implementations, the traffic advertisement may be carried in a new element of the beacon frame that is different than a TIM element.

Figure 15:
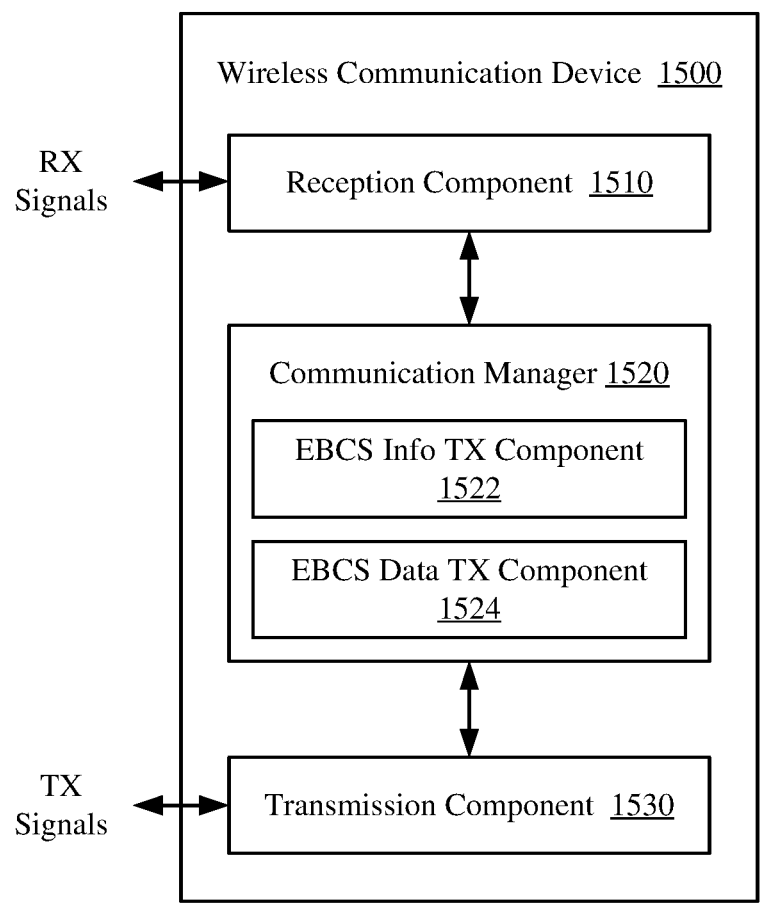
FIG. 15 shows a block diagram of an example wireless communication device according to some implementations.

FIG. 15 shows a block diagram of an example wireless communication device 1500 according to some implementations. In some implementations, the wireless communication device 1500 is configured to perform the process 1300 described above with reference to FIG. 13. The wireless communication device 1500 can be an example implementation of the wireless communication device 400 described above with reference to FIG. 4. For example, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 further includes an EBCS information transmission (TX) component 1522 and an EBCS data TX component 1524. Portions of one or more of the components 1522 and 1524 may be implemented at least in part in hardware or firmware. In some implementations, at least some of the components 1522 or 1524 are implemented at least in part as software stored in a memory (such as the memory 408). For example, portions of one or more of the components 1522 and 1524 can be implemented as non-transitory instructions (or "code") executable by a processor (such as the processor 406) to perform the functions or operations of the respective component.

The reception component 1510 is configured to receive RX signals, over a wireless channel, from one or more other wireless communication devices. The transmission component 1530 is configured to transmit TX signals, over a wireless channel, to one or more other wireless communication devices. The communication manager 1520 is configured to control or manage communications with one or more other wireless communication devices. In some implementations, the EBCS information TX component 1522 may broadcast an EBCS information frame advertising one or more EBCS services provided by the wireless communication device; and the EBCS data TX component 1524 may transmit a packet having a header followed by a data portion that carries data associated with a first EBCS service of the one or more EBCS services, where the header carries EBCS signaling indicating that the data is intended for STAs that are associated with the wireless communication device and STAs that are unassociated with the wireless communication device.

Figure 16:
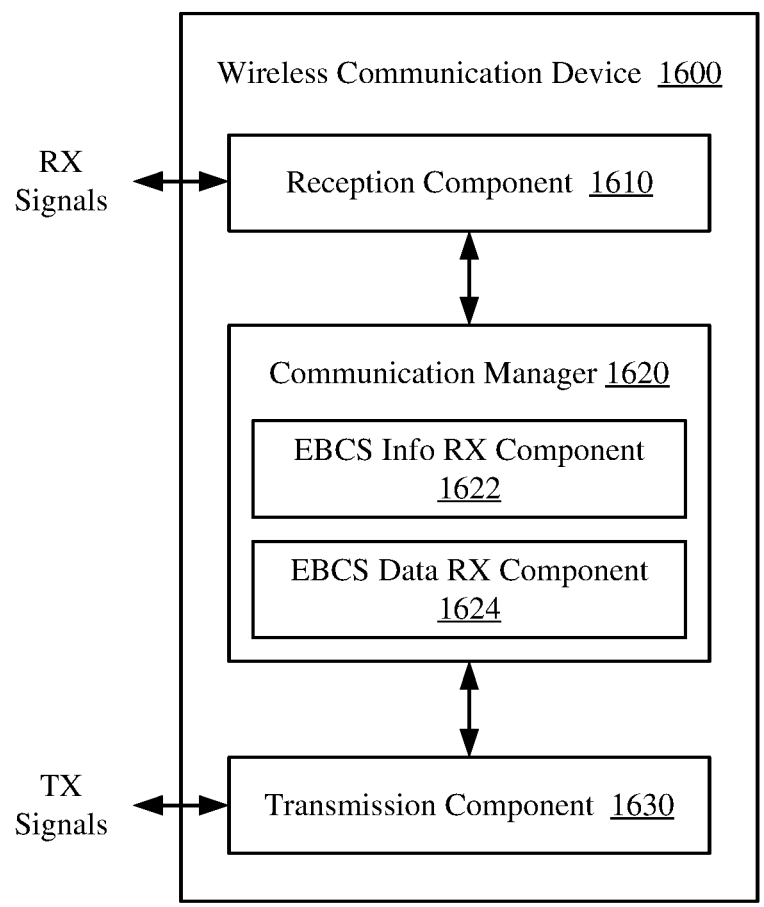
FIG. 16 shows a block diagram of an example wireless communication device according to some implementations.

FIG. 16 shows a block diagram of an example wireless communication device 1600 according to some implementations. In some implementations, the wireless communication device 1600 is configured to perform the process 1400 described above with reference to FIG. 14. The wireless communication device 1600 can be an example implementation of the wireless communication device 400 described above with reference to FIG. 4. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 further includes an EBCS information reception (RX) component 1622 and an EBCS data RX component 1624. Portions of one or more of the components 1622 and 1624 may be implemented at least in part in hardware or firmware. In some implementations, at least some of the components 1622 or 1624 are implemented at least in part as software stored in a memory (such as the memory 408). For example, portions of one or more of the components 1622 and 1624 can be implemented as non-transitory instructions (or "code") executable by a processor (such as the processor 406) to perform the functions or operations of the respective component.

The reception component 1610 is configured to receive RX signals, over a wireless channel, from one or more other wireless communication devices. The transmission component 1630 is configured to transmit TX signals, over a wireless channel, to one or more other wireless communication devices. The communication manager 1620 is configured to control or manage communications with one or more other wireless communication devices. In some implementations, the EBCS information RX component 1622 may receive an EBCS information frame advertising one or more EBCS services provided by a first AP; and the EBCS data RX component 1624 may receive, from the first AP, a first packet having a header followed by a data portion that carries data associated with a first EBCS service of the one or more EBCS services, where the header carries EBCS signaling indicating that the data is intended for STAs that are associated with the first AP and STAs that are unassociated with the first AP.

Implementation examples are described in the following numbered clauses:

1. A method for wireless communication by a wireless communication device, including:
broadcasting an enhanced broadcast services (EBCS) information frame advertising one or more EBCS services provided by the wireless communication device; and
transmitting a packet having a header followed by a data portion that carries data associated with a first EBCS service of the one or more EBCS services, the header carrying EBCS signaling indicating that the data is intended for wireless stations (STAs) that are associated with the wireless communication device and STAs that are unassociated with the wireless communication device.
2. The method of clause 1, where the EBCS signaling is carried in a medium access control (MAC) header that includes a receiver address (RA) field and a frame control field having type and subtype subfields, the type and subtype subfields collectively indicating a type of the packet.
3. The method of any of clauses 1 or 2, where the EBCS signaling includes values carried in the type and subtype subfields indicating that the packet is an EBCS Data frame.
4. The method of any of clauses 1 or 2, where the EBCS signaling includes an EBCS receiver address, carried in the RA field, that is different than a broadcast address which identifies packets broadcast to all users associated with the wireless communication device.
5. The method of any of clauses 1, 2, or 4, where the EBCS receiver address is known to STAs that support EBCS.
6. The method of any of clauses 1, 2, or 4, where the EBCS receiver address is the same for each of the one or more EBCS services provided by the wireless communication device.
7. The method of any of clauses 1, 2, or 4, where the EBCS receiver address is unique to the first EBCS service.
8. The method of any of clauses 1, 2, 4, or 7, where the EBCS receiver address is derived from a MAC address or an internet protocol (IP) address of a host device that hosts the first EBCS service.
9. The method of any of clauses 1-8, where the EBCS information frame further carries a traffic advertisement indicating a timing of data transmissions associated with each of the one or more EBCS services, the traffic advertisement including a bitmap indicating which of the one or more EBCS services are scheduled for data transmissions during a respective delivery traffic indication message (DTIM) period.
10. The method of any of clauses 1-8, further including:
broadcasting a beacon frame carrying a traffic advertisement indicating a timing of data transmissions associated with each of the one or more EBCS services.
11. The method of any of clauses 1-8 or 10, where the traffic advertisement includes a bitmap indicating which of the one or more EBCS services are scheduled for data transmissions during a respective DTIM period.
12. The method of any of clauses 1-8 or 10, where the traffic advertisement is carried in a new element of the beacon frame that is different than a traffic indication map (TIM) element.
13. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-12.
14. A method for wireless communication by a wireless communication device, including:
receiving an enhanced broadcast services (EBCS) information frame advertising one or more EBCS services provided by a first access point (AP); and
receiving, from the first AP, a first packet having a header followed by a data portion that carries data associated with a first EBCS service of the one or more EBCS services, the header carrying EBCS signaling indicating that the data is intended for wireless stations (STAs) that are associated with the first AP and STAs that are unassociated with the first AP.

15. The method of clause 14, where the EBCS signaling is carried in a medium access control (MAC) header that includes a receiver address (RA) field and a frame control field having type and subtype subfields, the type and subtype subfields collectively indicating a type of the first packet.

16. The method of any of clauses 14 or 15, where the EBCS signaling includes values carried in the type and subtype subfields indicating that the first packet is an EBCS Data frame.

17. The method of any of clauses 14 or 15, where the EBCS signaling includes an EBCS receiver address, carried in the RA field, that is different than a broadcast address which identifies packets broadcast to all users associated with the wireless communication device.

18. The method of any of clauses 14, 15, or 17, where the EBCS receiver address is known to the wireless communication device.

19. The method of any of clauses 14, 15, or 17, where the EBCS receiver address is the same for each of the one or more EBCS services provided by the wireless communication device.

20. The method of any of clauses 14, 15, or 17, where the EBCS receiver address is unique to the first EBCS service.

21. The method of any of clauses 14, 15, 17, or 20, further including:
receiving, from a second AP, a second packet carrying data associated with the first EBCS service, the second packet having an RA field set to the EBCS receiver address.

22. The method of any of clauses 14-21, where the EBCS information frame further carries a traffic advertisement indicating a timing of data transmissions associated with each of the one or more EBCS services, the traffic advertisement including a bitmap indicating which of the one or more EBCS services are scheduled for data transmissions during a respective delivery traffic indication message (DTIM) period, the method further including:
waking from a low-power state based on the timing of the data transmissions indicated by the traffic advertisement.

23. The method of any of clauses 14-21, further including:
receiving, from the first AP, a beacon frame carrying a traffic advertisement indicating a timing of data transmissions associated with each of the one or more EBCS services; and
waking from a low-power state based on the timing of the data transmissions indicated by the traffic advertisement.

24. The method of any of clauses 14-21 or 23, where the traffic advertisement comprises a bitmap indicating which of the one or more EBCS services are scheduled for data transmissions during a respective DTIM period.

25. The method of any of clauses 14-21 or 23, where the traffic advertisement is carried in a new element of the beacon frame that is different than a traffic indication map (TIM) element.

26. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 14-25.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
broadcasting an enhanced broadcast services (EBCS) information frame advertising one or more EBCS services provided by the wireless communication device; and
transmitting a packet having a header followed by a data portion that carries data associated with a first EBCS service of the one or more EBCS services, the header carrying EBCS signaling indicating that the data is intended for wireless stations (STAs) that are associated with the wireless communication device and STAs that are unassociated with the wireless communication device, wherein the EBCS signaling is carried in a medium access control (MAC) header that includes a frame control field having a type subfield and a subtype subfield that collectively indicate a type of the packet, the EBCS signaling comprising values carried in the type subfield and the subtype subfield indicating that the packet is an ECBS Data frame.

2. The method of claim 1, wherein the MAC header includes a receiver address (RA) field, the type subfield and the subtype subfield collectively indicating the type of the packet.

3. The method of claim 2, wherein the EBCS signaling comprises an EBCS receiver address, carried in the RA field, that is different than a broadcast address which identifies packets broadcast to all users associated with the wireless communication device.

4. The method of claim 3, wherein the EBCS receiver address is the same for each of the one or more EBCS services provided by the wireless communication device.

5. The method of claim 3, wherein the EBCS receiver address is unique to the first EBCS service.

6. The method of claim 5, wherein the EBCS receiver address is derived from a MAC address or an internet protocol (IP) address of a host device that hosts the first EBCS service.

7. The method of claim 1, wherein the EBCS information frame further carries a traffic advertisement indicating a timing of data transmissions associated with each of the one or more EBCS services, the traffic advertisement including a bitmap indicating which of the one or more EBCS services are scheduled for data transmissions during a respective delivery traffic indication message (DTIM) period.

8. The method of claim 1, further comprising:
broadcasting a beacon frame carrying a traffic advertisement indicating a timing of data transmissions associated with each of the one or more EBCS services.

9. The method of claim 8, wherein the traffic advertisement comprises a bitmap indicating which of the one or more EBCS services are scheduled for data transmissions during a respective DTIM period.

10. The method of claim 8, wherein the traffic advertisement is carried in an element of the beacon frame that is different than a traffic indication map (TIM) element.

11. A wireless communication device comprising:
at least one processor; and
at least one memory communicatively coupled with the at least one processor and storing processor-readable code that, when executed by the at least one processor, is configured to:
broadcast an enhanced broadcast services (EBCS) information frame advertising one or more EBCS services provided by the wireless communication device; and
transmit a packet having a header followed by a data portion that carries data associated with a first EBCS service of the one or more EBCS services, the header carrying EBCS signaling indicating that the data is intended for wireless stations (STAs) that are associated with the wireless communication device and STAs that are unassociated with the wireless communication device, wherein the EBCS signaling is carried in a medium access control (MAC) header that includes a frame control field having a type subfield and a subtype subfield that collectively indicate a type of the packet, the EBCS signaling comprising values carried in the type subfield and the subtype subfield subfields indicating that the packet is an ECBS Data frame.

12. The wireless communication device of claim 11, wherein the EBCS signaling is carried in a medium access control (MAC) header that includes a receiver address (RA) field, the EBCS signaling comprising an EBCS broadcast address, carried in the RA field, that is different than a broadcast address which identifies packets broadcast to all users associated with the wireless communication device.

13. The wireless communication device of claim 11, wherein the EBCS information frame further carries a traffic advertisement indicating a timing of data transmissions associated with each of the one or more EBCS services, the traffic advertisement including a bitmap indicating which of the one or more EBCS services are scheduled for data transmissions during a respective delivery traffic indication message (DTIM) period.

14. A method for wireless communication performed by a wireless communication device, comprising:
receiving an enhanced broadcast services (EBCS) information frame advertising one or more EBCS services provided by a first access point (AP); and
receiving, from the first AP, a first packet having a header followed by a data portion that carries data associated with a first EBCS service of the one or more EBCS services, the header carrying EBCS signaling indicating that the data is intended for wireless stations (STAs) that are associated with the first AP and STAs that are unassociated with the first AP, wherein the EBCS signaling is carried in a medium access control (MAC) header that includes a frame control field having a type subfield and a subtype subfield that collectively indicate a type of the first packet, the EBCS signaling comprising values carried in the type subfield and the subtype subfield indicating that the first packet is an ECBS Data frame.

15. The method of claim 14, wherein the MAC header includes a receiver address (RA) field, the type subfield and the subtype subfield collectively indicating the type of the first packet.

16. The method of claim 15, wherein the EBCS signaling comprises an EBCS receiver address, carried in the RA field, that is different than a broadcast address which identifies packets broadcast to all users associated with the wireless communication device.

17. The method of claim 16, wherein the EBCS receiver address is the same for each of the one or more EBCS services provided by the wireless communication device.

18. The method of claim 16, wherein the EBCS receiver address is unique to the first EBCS service.

19. The method of claim 18, further comprising:
receiving, from a second AP, a second packet carrying data associated with the first EBCS service, the second packet having an RA field set to the EBCS receiver address.

20. The method of claim 14, wherein the EBCS information frame further carries a traffic advertisement indicating a timing of data transmissions associated with each of the one or more EBCS services, the traffic advertisement including a bitmap indicating which of the one or more EBCS services are scheduled for data transmissions during a respective delivery traffic indication message (DTIM) period, the method further comprising:
waking from a low-power state based on the timing of the data transmissions indicated by the traffic advertisement.

21. The method of claim 14, further comprising:
receiving, from the first AP, a beacon frame carrying a traffic advertisement indicating a timing of data transmissions associated with each of the one or more EBCS services; and
waking from a low-power state based on the timing of the data transmissions indicated by the traffic advertisement.

22. The method of claim 21, wherein the traffic advertisement comprises a bitmap indicating which of the one or more EBCS services are scheduled for data transmissions during a respective DTIM period.

23. The method of claim 21, wherein the traffic advertisement is carried in a new element of the beacon frame that is different than a traffic indication map (TIM) element.

24. A wireless communication device comprising:
at least one processor; and
at least one memory communicatively coupled with the at least one processor and storing processor-readable code that, when executed by the at least one processor, is configured to:
receive an enhanced broadcast services (EBCS) information frame advertising one or more EBCS services provided by a first access point (AP); and
receive an enhanced broadcast services (EBCS) information frame advertising one or more EBCS services provided by a first access point (AP); and
receive, from the first AP, a packet having a header followed by a data portion that carries data associated with a first EBCS service of the one or more EBCS services, the header carrying EBCS signaling indicating that the data is intended for wireless stations (STAs) that are associated with the first AP and STAs that are unassociated with the first AP, wherein the EBCS signaling is carried in a MAC header that includes a frame control field having a type subfield and a subtype subfield that collectively indicate a type of the packet, the EBCS signaling comprising values carried in the type subfield and the subtype subfield indicating that the packet is an ECBS Data frame.

25. The wireless communication device of claim 24, wherein the EBCS signaling is carried in a medium access control (MAC) header that includes a receiver address (RA) field, the EBCS signaling comprising an EBCS broadcast address, carried in the RA field, that is different than a broadcast address which identifies packets broadcast to all users associated with the wireless communication device.

26. The wireless communication device of claim 24, wherein the EBCS information frame further carries a traffic advertisement indicating a timing of data transmissions associated with each of the one or more EBCS services, the traffic advertisement including a bitmap indicating which of the one or more EBCS services are scheduled for data transmissions during a respective delivery traffic indication message (DTIM) period, execution of the processor-readable code being further configured to:
wake from a low-power state based on the timing of the data transmissions indicated by the traffic advertisement.

* * * * *